United States Patent [19]

Taniguchi et al.

[11] Patent Number: 4,602,861
[45] Date of Patent: Jul. 29, 1986

[54] AUTO-FOCUSING SYSTEM

[75] Inventors: Nobuyuki Taniguchi, Tondabayashi; Takeshi Egawa, Osaka; Tohru Matsui, Sakai; Takanobu Omaki, Sennan; Norio Ishikawa, Osaka; Akiyoshi Nakamura, Sakai; Shuzo Matsushita, Ikeda, all of Japan

[73] Assignee: Minolta Camera Kabushiki Kaisha, Osaka, Japan

[21] Appl. No.: 561,972

[22] Filed: Dec. 16, 1983

[30] Foreign Application Priority Data

Dec. 23, 1982 [JP] Japan ................................. 57-229143
Dec. 29, 1982 [JP] Japan ................................. 57-228554
Jan. 17, 1983 [JP] Japan ..................................... 58-6027
Feb. 8, 1983 [JP] Japan .................................... 58-19103

[51] Int. Cl.$^4$ ............................................. G03B 3/00
[52] U.S. Cl. .................................................. 354/403
[58] Field of Search ............................... 354/400–409, 354/286, 289.12

[56] References Cited

U.S. PATENT DOCUMENTS

| 4,182,563 | 1/1980 | Biber et al. | 354/197 |
| 4,257,705 | 3/1981 | Hosoe et al. | 354/403 X |
| 4,488,798 | 12/1984 | Iida et al. | 354/402 |
| 4,509,842 | 4/1985 | Taniguchi et al. | 354/402 |

FOREIGN PATENT DOCUMENTS

| 54-108628 | 8/1979 | Japan . | |
| 55-111929 | 8/1980 | Japan . | |
| 55-127524 | 10/1980 | Japan . | |
| 0093326 | 6/1982 | Japan | 354/402 |
| 57-154224 | 9/1982 | Japan . | |
| 57-150808 | 9/1982 | Japan . | |
| 57-197524 | 12/1982 | Japan . | |
| 57-210326 | 12/1982 | Japan . | |

Primary Examiner—William B. Perkey
Attorney, Agent, or Firm—Watson Cole Grindle & Watson

[57] ABSTRACT

An auto-focusing system includes a focus condition detector which detects the focus condition based on infrared light. A data producer is provided for producing a deflection signal indicating the difference between an image forming distance for infrared light and that for visible light, due to aberration. In accordance with the detected focus condition and deflection signal, an objective lens is shifted to a position for properly focusing an image of visible light on an image forming plane.

21 Claims, 26 Drawing Figures

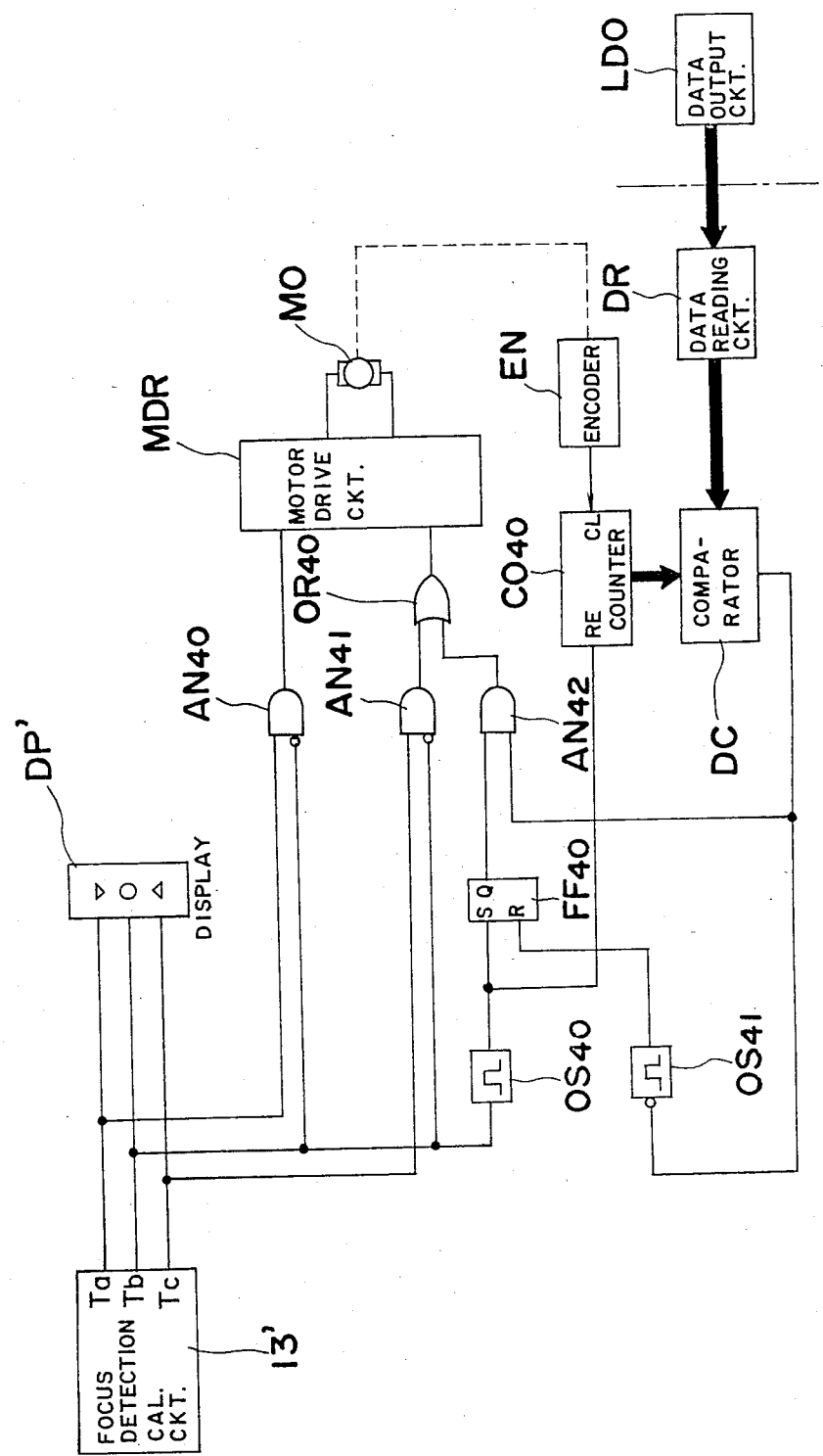

AUTO-FOCUSING SYSTEM

BACKGROUND OF THE INVENTION

1. Field of the Invention

The present invention relates to an auto-focusing device and method of a camera of an interchangeable objective lens type and, more particularly, to an auto-focusing system wherein the reflected light from an object to be photographed passes through the objective lens of the interchangeable lens and forms an image on or near a predetermined image forming plane, which image is detected for detecting the degree of out of focus, thereby controlling the lens shift by the detected degree of out of focus. The present invention also relates to an interchangeable lens itself for use in the above described type of camera.

2. Description of the Prior Art

There have been conventionally proposed various types of the above described auto-focusing method, but most of them use visible light. Therefore, when the intensity of the visible light is very weak, such as when the scenery is dark, it is very difficult to detect the focusing condition of the target object, resulting in an error control of the objective lens. Also, for detecting the image, a charge accumulating device, such as CCD, can be employed, but would result in a disadvantage that the charging period becomes long as the visible light becomes weak, resulting in long time of focus detection.

It is known in the art that the photoelectric conversion device, such as CCD or photodiode, for use in focus detection is generally more sensitive to infrared rays than the visible rays. Also, it is known in the art that the infrared rays reflect at a high rate even on a black object and also on an organic object.

From this view point, it is possible to detect, if the infrared ray are used for focus detection, the focusing condition of an object even if the object is located in a dark place, and consequently improving the focus detection ability.

But, on the other hand, if the infrared rays are used for focus detection, it takes a disadvantage that there will be a difference in focusing distance between the the infrared rays and the visible rays, due to color aberration, and such a difference varies as the type of an interchangeable lens mounted on a camera body changes. Therefore, unless a suitable correction is effected, a picture taken by an auto-focusing system using the infrared rays always results more or less in out of focus.

To remove the above disadvantage, an improved auto-focusing system is proposed in Japanese Patent Laid-open Publication (Tokkaisho) No. 57-154224, wherein a signal pin having a length corresponding to the focusing distance difference is provided to each interchangeable lens, and a focus detecting device having a means to correct the focusing distance difference by the signal pin are provided. According to the proposed device as described above, the signal pin extending from the lens must have a required strength to avoid undesirable break or bent, and also the signal pin should be positioned with a high accuracy to enable the precise correction. Also, the focus detecting device provided in the camera body will have a complicated structure, resulting in high manufacturing cost, and because of the complicated structure, it may not be able to correct the difference to the required degree due to the inaccuracy of size and positioning of each constructing part.

Furthermore, according to the auto-focusing device disclosed in Tokkaisho No. 57-154224, it is very difficult to detect the focusing when a target object is under a weak visible light and yet containing almost no infrared rays, such as under fluorescent lamp, not only when detecting the focus condition by way of vible light, but also by way of infrared rays. Moreover, if the target object has no or hardly any contrast, such as in the case of plain wall, it is very difficult to detect the focus condition even when using the infrared rays.

Another improved auto-focusing system is proposed in Japanese Patent Laid-open Publication (Tokkaisho) No. 57-150808, which is so designed that the focus condition can be detected either by the visible rays or infrared rays. The auto-focusing system according to Tokkaisho No. 57-150808 comprises two photoelectric conversion means, one for visible rays and the other for infrared rays, and a beam splitter for dividing the rays from the object in terms of amount into rays to be directed to the visible light photoelectric conversion means and to the infrared light photoelectric conversion means. An infrared cut filter is disposed between the visible light photoelectric conversion means and beam splitter for cutting the infrared rays to be directed to the visible light photoelectric conversion means. Each photoelectric conversion means is connected, through a discrimination circuit, to a selection circuit and further to a focus condition detecting circuit.

According to the auto-focusing system of Tokkaisho No. 57-150808, it is stated that when no infrared light pass filter is used to carry out photographing using visible rays, almost the same amount of light impinges on both photoelectric conversion means and, therefore, the outputs from both photoelectric conversion means have approximately the same level. Thus, the discrmination circuit discriminates that the ratio of outputs from both photoelectric conversion means is approximately equal to one, thereby actuating the selection circuit to select output from the visible light photoelectric conversion means.

It further states that when the infrared light pass filter is used to carry out photographing using infrared rays, the amount of light impinging on the infrared light photoelectric conversion means is greater than that on the visible light photoelectric conversion means. Thus, the discrimination circuit discriminates that the ratio of outputs from both photoelectric conversion means is not equal to one, thereby actuating the selection circuit to select output from the infrared light photoelectric conversion means.

The focus condition detecting circuit operates in response to the output signal selected by the selection circuit.

From a practical point of view, however, there are a variety of objects differing from one another in reflection properties. Thus, it is not always true that the ratio between outputs from the visible light photoelectric conversion means and from the infrared light photoelectric conversion means is constant with use of no infrared light pass filter. Thus, it is practically very difficult to set a level or borderline for causing selection of an output from visible light photoelectric conversion means whenever photographs are taken using the visible light. Therefore, even when the output from the visible light photoelectric conversion means is selected, there may be a case wherein the focus detection is carried out using the infrared rays, resulting in out of focus, because there is a difference in an image forming distance of the objective lens between the visible rays and infrared rays. Moreover, when taking a photograph under the A-light source (tungsten type lamp) or under the natural light, there may be a case in which the infrared rays are stronger than the visible rays. In such a case, the photographing is carried out using the visible rays, but the focus detection is carried out using infrared rays, resulting in an error in focus adjustment.

Also, according to the prior art, it is well know to emit an auxiliary light to the object, when the object is too dark to carry out the focus detection. In this case, if the object is people, and when the auxiliary light is visible light, such an auxiliary light makes people unpleasant. In order to overcome this, an improved focus detecting device is disclosed in Japanese Patent Laid-open Publication (Tokkaisho) 55-111929, which device emits, instead of visible lights, infrared rays as the auxiliary light when the target object is very dark and has less contrast. However, Japanese Patent Laid-open Publication (Tokkaisho) 55-111929 does not take any consideration to the difference in focusing distance between the the infrared rays and the visible rays, due to color aberration of the objective lens.

SUMMARY OF THE INVENTION

The present invention has been developed with a view to substantially solving the above described disadvantages and has for its essential object to provide an improved auto-focusing system which can carry out an auto-focusing operation for the visible light using infrared rays with high accuracy, without employing any mechanical or optical correcting means.

It is also an essential object of the present invention to provide an auto-focusing system of the above described type which can carry out an auto-focusing operation quickly and accurately, with an aid of emission of infrared rays, even when the target object is dark or has a low contrast.

It is a further object of the present invention to provide an interchangeable lens suited for use with a camera eploying an auto-focusing system of the above described type.

According to the auto-focusing system of the present invention, a focus condition is detected based on the infrared light. A data producer is provided for producing a deflection signal indicating a difference between an image forming distance for the infrared light and that for the visible light, due to aberration. In accordance with the detected focus condition and deflection signal, an objective lens is shifted to a position for properly focusing an image of visible light on a predetermined image forming plane.

Furthermore, according to the present invention, an auxiliary light source for emitting infrared light is provided for lighting an object, thus facilitating the focus cndition detection. According to one embodiment, a dark object is brightened by the emitted infrared light to increase the detecting level, and according to another embodiment, a plain object, such as a wall, is spotlighted by the emitted infrared light to provide a contrast.

Moreover, according to the present invention, the objective lens can be shifted in one step or in two steps to bring it to the properly focused position for the visible light. In the case of one step, an amount of lens shift is calculated using the detected focus condition based on the infrared light and deflection signal, and then, the lens is shifted in accordance with the calculated result. In the case of two steps, the lens is first shifted based on the focus detection under theinfrared light, and is shifted again based on the deflection signal.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 3 is a diagrammatic view showing one example of a beam splitter employed in the auto-focusing system of Fig. 1a;

FIG. 21 is a circuit diagram of an auto-focusing system according to a further embodiment the present invention.

DESCRIPTION OF THE PREFERRED EMBODIMENTS

Figure 1A:
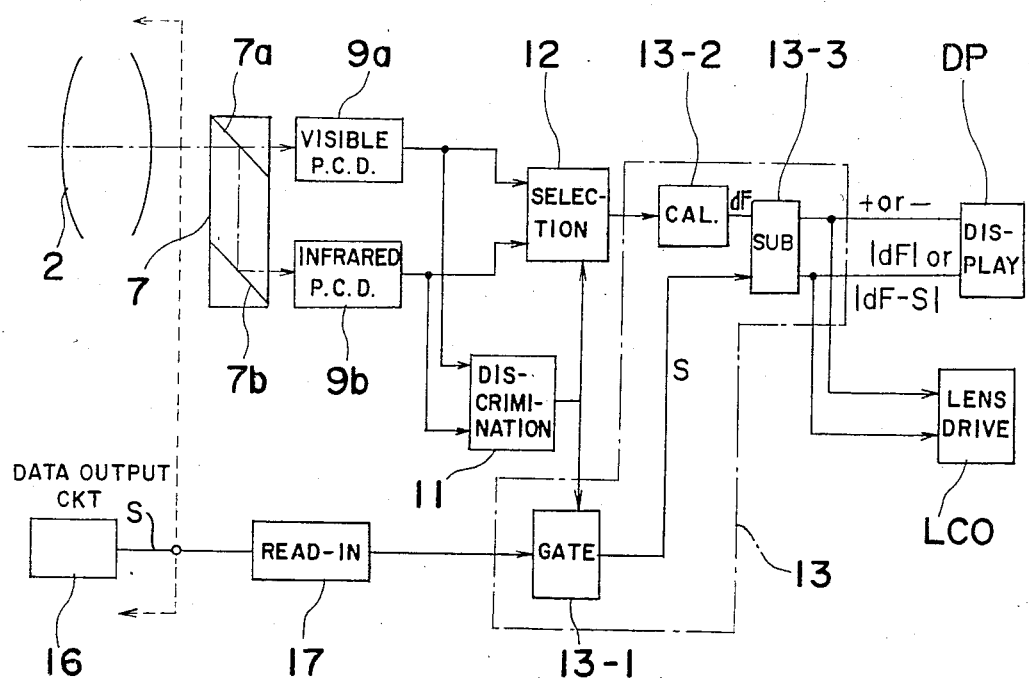
FIG. 1a is a block diagram of an auto-focusing system according to the present invention.
Figure 2A:
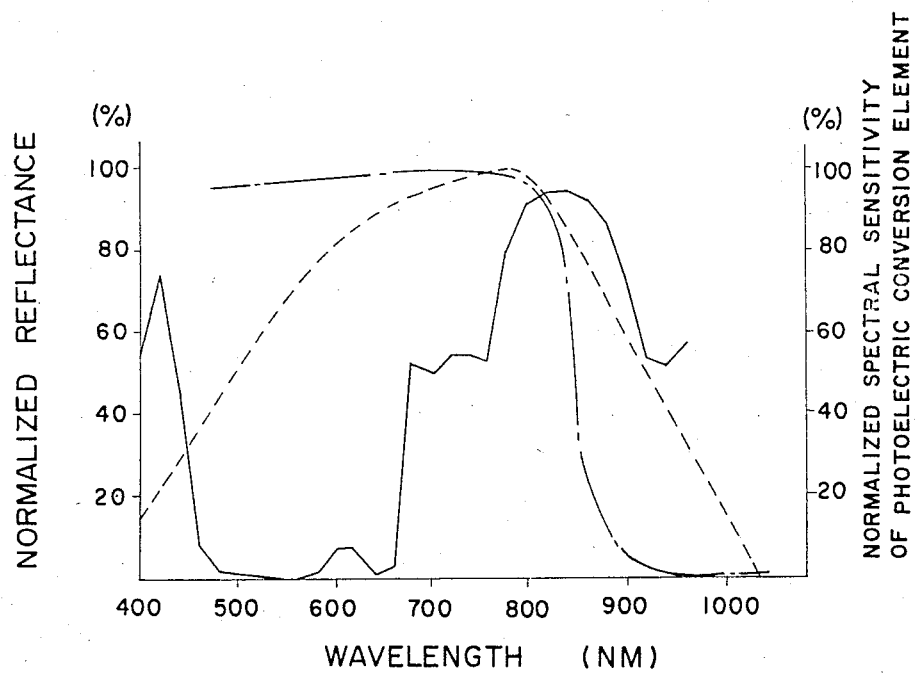
FIG. 2a is a graph showing a spectral sensitivity of a visible light photoelectric conversion means and a normalized reflectance of a first reflecting face of a beam splitter.
Figure 2B:
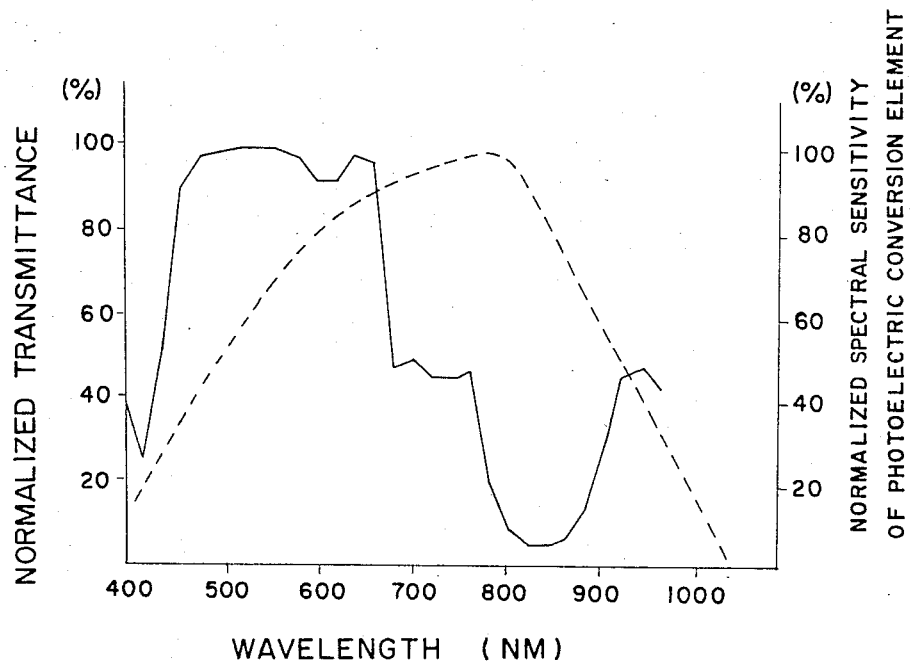
FIG. 2b is a graph similar to FIG. 2a, but particularly showing a spectral sensitivity of an infrared light photoelectric conversion means.

Referring to FIG. 1a, a block diagram of an auto-focusing system of the present invention is shown. A reference number 2 designates an objective lens included in an interchangeable lens; 7 designates a beam splitter defining a major portion of an optical arrangement of focus detector; and 9a and 9b designate photoelectric conversion devices for visible light and infrared light, respectively. The beam splitter 7 is provided for splitting the light from a target object and passed through the lens 2 into visible light and infrared light, and for this purpose, it has a first and second reflecting faces 7a and 7b. The first reflecting face 7a has a normalized reflectance (normalized in percentage of reflected light when the incident light is rendered as "1") as shown by a real line in FIG. 2a, and a normalized transmittance (normalized in percentage of transmitted light when the incident light is rendered as "1") as shown by a real line in FIG. 2b. As apparent from the graphs of FIGS. 2a and 2b, lights having wavelength of about 700 nanometers or longer, i.e., lights in infrared and/or near-infrared region, are reflected on the first reflecting face 7a, and lights having wavelength of less than about 700 nanometers, i.e., visible lights, are transmitted through the first reflecting face 7a.

A term infrared used herein includes a range in which photoelectric conversion device 9b for the infrared light is sensitive, such as lights having wavelength of 650-900 nanometers. Thus, a term infrared used herein includes near-infrared and partly visible lights of long wavelength.

The photoelectric conversion device 9a is so located as to receive the lights transmitted through the first reflecting face 7a. Thus it mainly receives visible lights. The photoelectric conversion device 9b is so located as to receive the lights reflected from the second reflecting face 7b which has a high reflectance at least in the infrared region. Thus, the photoelectric conversion device 9b mainly receives infrared lights.

Instead of the beam splitter 7 described above, a normal beam splitter which merely splits the lights in terms of amount can be employed. In this case, a filter for cutting infrared rays should be provided in front of the visible light photoelectric conversion device 9a, and a filter of cutting visible light should be provided in front of the infrared light photoelectric conversion device 9b.

Figure 1B:
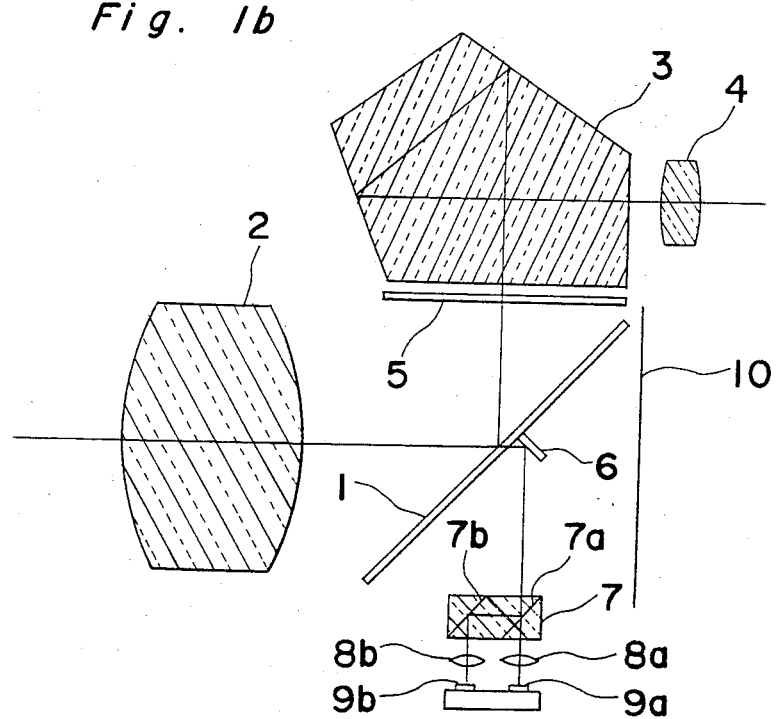
FIG. 1b is a diagrammatic view showing an optical arrangement of the auto-focusing system of the present invention employed in a camera.

Referring to FIG. 1b, an optical arrangement of a single-reflex interchangeable lens type camera employing the auto-focusing system of the present invention is shown. A reference number 1 designates a main mirror defined by a half-mirror plate; 6 designates a submirror supported by the main mirror 1; 8a and 8b designate relay lenses; 3 is a pentaprism; 4 is an eyepiece lens; 5 is a focus plate; and 10 is a predetermined image forming plane (film plane) for which objective lens 2 is to be adjusted to focus visual light thereon. Both main mirror 1 and submirror 6 have a uniform reflectance characteristic to all colors including visible light and infrared light. The photoelectric conversion devices 9a and 9b have a normalized spectral sensitivity (normalized in percentage when the maximum sensitivity is rendered as "1"), as shown by a dotted line in FIGS. 2a and 2b.

Because of the color aberration of the objective lens, an image forming distance for the infrared light is longer than that for the visible light by an amount dL, and such an amount dL is referred to as deflection dL. The deflection dL varies with respect to the type of interchangeable lens depending on the various factors, such as number and arrangement of lenses defining one interchangeable lens, focal length, etc. Therefore, each interchangeable lens has its own deflection dL which is different from the deflection dL of another interchangeable lens. Furthermore, the deflection dL varies relatively to the change of focus distance, or to the change of focal length if the interchangeable lens is a zoom lens.

If the lens is shifted to an in-focus position in accordance with a focus detection carried out by the infrared lights, and thereafter, if a picture is taken with visible light, the picture will result in out of focus. To obtain a properly focused picture, in this case, it is necessary to correct the deflection dL, which is intrinsic to each type of interchangeable lens.

According to the optical arrangement shown in FIG. 1a or 1b, an optical distance between the lens 2 and relay lens 8b, or infrared light photoelectric conversion device 9b, is longer than an optical distance between the lens 2 and relay lens 8a, or visible light photoelectric conversion device 9a, by an optical distance d/n, wherein d is an actual distance between the first and second reflecting faces 7a and 7b, and n is a refractive index of the beam splitter 7, provided that the photoelectric conversion devices 9a and 9b are both positioned at the same distance from the beam splitter 7. If the optical distance d/n is selected to be equal to the deflection dL for one standard lens, an image of visible light can be properly focused on the visible light conversion device 9a as well as on predetermined image forming plane 10 and, at the same time, an image of infrared light can be properly focused on the infrared light conversion device 9b, provided that said one standard lens is mounted on the camera. Thus, in this case, the lens can be properly focused for the visible light with the focus detection carried out by the infrared light.

If the lens is changed to another interchangeable lens having a deflection dL' which is greater than the deflection dL, such a deflection dL' can not be properly corrected by the optical distance d/n. To properly correct the deflection dL', the camera must be provided with a following correction data S:

$$S = dL' - d/n.$$

In the foregoing description, the infrared lights having a predetermined wavelength should be used for determining the data S, and in the case of using the beam splitter 7, such a wavelength should preferably be 830 nanometers, at which the production of normalized reflectance of the reflecting face 7a and normalized spectral sensitivity of the photoelectric conversion device 9b takes the maximum value.

Referring again to FIG. 1a, both outputs from the visible light photoelectric conversion device 9a and from the infrared light photoelectric conversion device 9b are applied to a discrimination circuit 11 and also to selection circuit 12. The discrimination circuit 11 discriminates which one of the two outputs from the devices 9a and 9b is greater, and produces a discrimination signal indicating the one which is greater. The discrimination signal is applied to the selection circuit 12, and also to other circuits, such as a gate circuit 13-1 provided in a focus detection calculation circuit 13. A reference number 16 designates a data output circuit installed in each interchangeable lens for producing a correction data S intrinsic to each interchangeable lens. The data output circuit 16 is connectable, when the lens is mounted on the camera, to a read-out circuit 17 for supplying the correction data S to the gate circuit 13-1.

When the gate circuit 13-1 is receiving a discrimination signal indicating that the output from the infrared light photoelectric conversion device 9b is greater than that from the visible light photoelectric conversion device 9a, the gate circuit 13-1 permits to pass the correction data S from the read-out circuit 17 to a subtractor 13-3.

On the contrary, when the gate circuit 13-1 is receiving a discrimination signal indicating that the output from the visible light photoelectric conversion device 9a is greater than that from the infrared light photoelectric conversion device 9b, the gate circuit 13-1 cuts the correction data S, and instead, provides a data representing zero to the subtractor 13-3.

The selection circuit 12 operates in such a manner that it produces the output from the infrared light photoelectric conversion device 9b when the discrimination signal indicating that the output from the infrared light photoelectric conversion device 9b is greater than that from the visible light photoelectric conversion device 9a. Contrary, the selection circuit 12 produces the output from the visible light photoelectric conversion device 9a when the discrimination signal indicating that the output from the visible light photoelectric conversion device 9a is greater than that from the infrared light photoelectric conversion device 9b. The output produced from the selection circuit 12 is applied to a calculation circuit 13-2 which calculates an amount of defocus (out of focus) of the image formed by visual light on image forming plane 10 as well as on the device 9a, and also a direction of defocus whether it is defocused forwardly or rearwardly. After calculating, the calculation circuit 13-2 produces a defocus signal dF representing the calculated amount and direction of defocus. The defocus signal dF is applied to a subtractor 13-3 which subtracts the data S from the defocus signal dF and produces an absolute value of the subtracted result, i.e., $|dF-S|$. When the data S is equal to zero, the subtracted result is $|dF|$. The subtractor 13-3 also produces a signal representing + or − for the direction of defocus.

The outputs of the subtractor 13-3 are applied to a display device DP for displaying the amount and direction of defocus as obtained from the subtractor 13-3, and also to a lens driver LCO for driving the lens 2 based on the direction of defocus signal from the subtractor 13-3.

In the foregoing description, the amount and direction of defocus can be calculated in a manner disclosed in U.S. Pat. No. 4,333,007 patented June 1, 1982 to Langlais et al., 4,341,953 patented July 27, 1982 to Sakai et al. or in Japanese Patent Laid-open Publication (Tokkaisho) No. 57-45510.

Furthermore, when the visible light photoelectric conversion device 9a is selected for carrying out the focus detection with visible light, the display device DP displays information based on the signal $|dF|$, but when the infrared light photoelectric conversion device 9b is selected for carrying out the focus detection with infrared light, the display device DP displays information based on the signal $|dF-S|$. Therefore, in either cases, the objective lens can be so adjusted as to properly focus the image for the visible light.

According to the block diagram shown in FIG. 1a, each interchangeable lens produces a data S ($=dL-d/n$) which is determined by the deflection dL and distance d/n with an assumption that the distance d/n is constant. If the distance d/n of one camera body is difference from the other camera body, and if the interchangeable lens is applicable to both camera bodies, it is necessary to change the data S with respect to the change of the distance d/n. This can be accomplished by two different ways. The first way is to store a data dL to each interchangeable lens, and store a data d/n to each camera body, and by the use of data dL from the lens and d/n from the camera body, the required data S is calculated. The second way is to store a data S to each interchangeable lens, in which S is equal to dL-d/n, wherein d/n is an optical distance for the standard camera body. The camera body other than the standard is stored with a difference dP between the optical distance d/n for the standard camera and its optical distance d/n. When the interchangeable lens is mounted on the standard camera body, the data S from the lens is used in the camera body without any change. But, when the interchangeable lens is mounted on a non-standard camera body, the data S from the lens is corrected using the difference dP.

Figure 3:
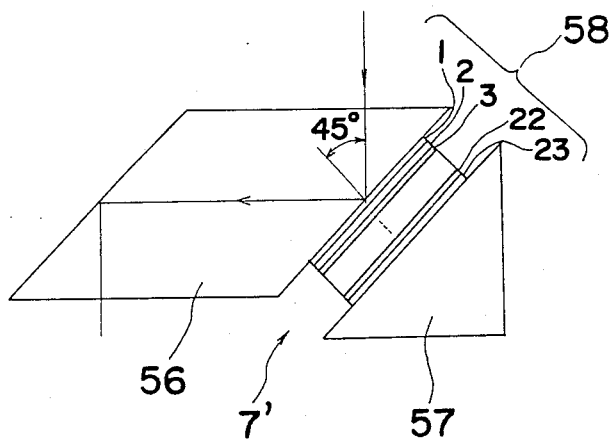

Referring to FIG. 3, there is shown a first modification of the beam splitter 7 described above. A beam splitter 7' shown therein includes a parallelepiped glass block 56, a triangle glass block 57, and a multi-film layer 58 sandwiched between blocks 56 and 57. The multi-film layer 58 is defined by twenty-three films deposited one over the other by a suitable depositing method. The twenty-three films have refractive index and optical thickness as given in Table 1 below.

TABLE 1

| Layer No. | 1 | 2 | 3 | 4 | 5 | 6 | 7 | 8 | 9 | 10 | 11 | 12 | 13 |
|---|---|---|---|---|---|---|---|---|---|---|---|---|---|
| Refractive Index n | 1.38 | 2.30 | 1.38 | 2.30 | 1.38 | 2.30 | 1.38 | 2.30 | 1.38 | 2.30 | 1.38 | 2.30 | 1.38 |
| Optical Thickness nd | $0.32\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ |

| Layer No. | 14 | 15 | 16 | 17 | 18 | 19 | 20 | 21 | 22 | 23 |
|---|---|---|---|---|---|---|---|---|---|---|
| Refractive Index n | 2.30 | 1.38 | 2.30 | 1.38 | 2.30 | 1.38 | 2.30 | 1.38 | 2.30 | 1.38 |
| Optical Thickness nd | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.32\lambda_0$ |

*Note: $\lambda_0 = 1100$ nanometers

Figure 4:
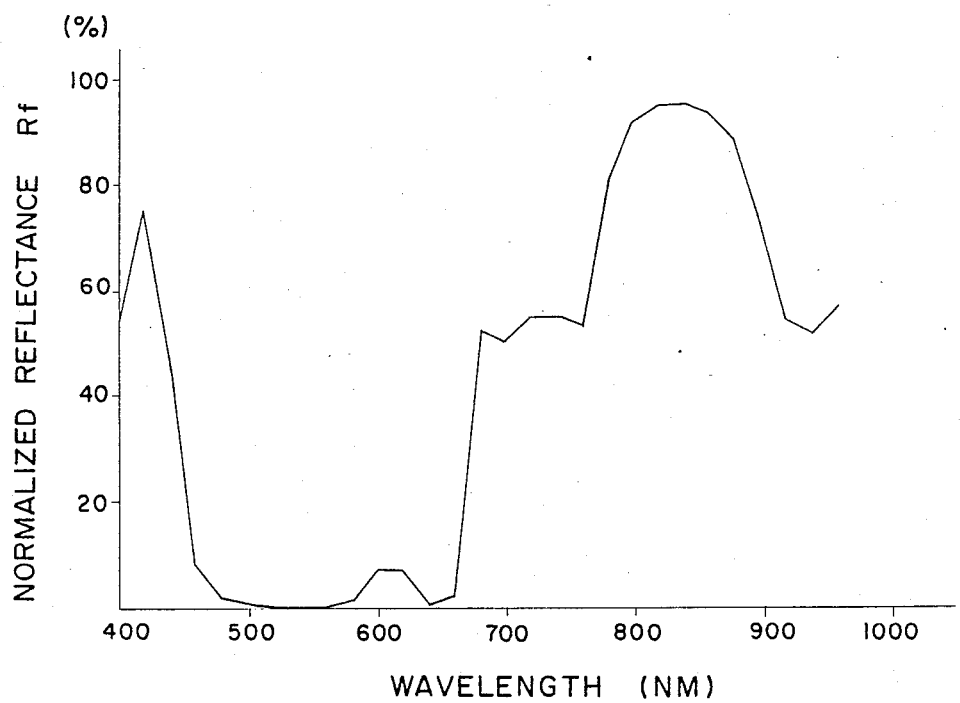
FIG. 4 is a graph showing a normalized reflectance of a junction face of glass blocks of defining the beam splitter of FIG. 3.

It is to be noted that the glass blocks 56 and 57 have a refractive index of 1.5168. Of the twenty-three films in the multi-film layer 58, the films having a refractive index of 1.38 as shown in Table 1 are made of $MgF_2$, and the films having a refractive index of 2.30 are made of $TiO_2$ or $CeO_2$. When light rays hit on the junction face between the glass blocks 56 and 57 with an incident angle of 45°, as illustrated in FIG. 3, rays in infrared region reflect with a high percentages, but rays in visible light region reflect with a low percentages, as shown in a graph of FIG. 4, wherein abscissa and ordinate represent, respectively, wavelength in nanometers and normalized reflectance Rf in percentages. More specifically, the reflectance is less than 10% within a visible light range, such as 460-660 nanometers, and is greater than 90% within an infrared light range, such as 800-870 nanometers. Since twenty-three films of the multi-film layer 58 are made of dielectric material, such as $MgF_2$ and $TiO_2$, or $CeO_2$, no light is absorbed in these films. Thus, the transmittance Tf of the rays through the junction can be given as:

$$Tf \approx 100 - (\%).$$

Therefore, it can be said that the transmittance is greater than 90% in a visible light range, 460-660 nanometers, and is less than 10% in an infrared light range, 800-870 nanometers. Thus, when the beam splitter 7' is used, it is possible to divide the incident light into visible light and infrared light with almost no loss of light.

Figure 5:
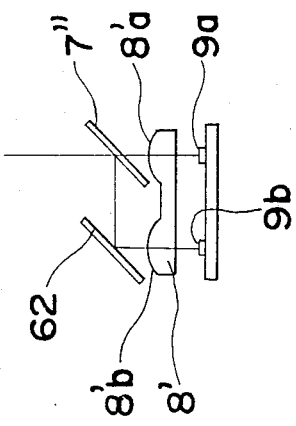
FIG. 5 is a diagrammatic view showing another example of a beam splitter.

Referring to FIG. 5, there is shown a second modification of the beam splitter 7 described above. A beam splitter 7" shown therein is a so-called half-mirror type defined by a base glass plate 60 and a multi-film layer 61 deposited on the base glass plate 60. The multi-film layer 61 has thirteen films deposited one over the other through a suitable depositing method. The thirteen films have refractive index and optical thickness as given in Table 2 below.

ranged as to have reflectance and transmittance characteristic varied with respect to wavelength in a similar manner to the first reflecting face 7a. More specifically, the second reflecting face 7b can be so arranged as to have a normalized reflectance as shown by a dot-dash line in FIG. 2a. When this is done, the range in which the infrared light photoelectric conversion device 9b receives light is narrowed. Accordingly, the wavelength of light that can be detected by the infrared light photoelectric conversion device 9b is limited to a certain narrow range, resulting in preciseness of the deflection dL. Thus, the correction using the deflection dL (or data S) can be done with a high accuracy. Also, in a case where an auxiliary light is emitted, an infrared LED or infrared laser having intense beam with a high reflectance to the first and second reflecting faces 7a and 7b should be used, thereby improving the accuracy of the correction using deflection dL (or data S). In this case, it is preferable to provide a light absorber at left end surface, when viewed in FIG. 1b, of the beam splitter 7, so that the lights which have passed through the second reflecting face 7b will not reflect back on such an end surface.

Also, in the above description, a beam splitter having a high transmittance of visible light and a high reflectance of infrared light is used. But instead, a beam splitter having a high reflectance of visible light and a high transmittance of infrared light can be used.

Furthermore, a beam splitter having three reflecting faces can be used. In this case, the first reflecting face reflects infrared lights and transmits visible lights. The second reflecting face receives the infrared lights reflected from the first reflecting face and reflects infrared lights having a wavelength of a first particular range, and transmits infrared lights having a wavelength of a

TABLE 2

| Layer No. | 1 | 2 | 3 | 4 | 5 | 6 | 7 | 8 | 9 | 10 | 11 | 12 | 13 |
|---|---|---|---|---|---|---|---|---|---|---|---|---|---|
| Refractive Index n | 1.38 | 2.30 | 1.38 | 2.30 | 1.38 | 2.30 | 1.38 | 2.30 | 1.38 | 2.30 | 1.38 | 2.30 | 1.38 |
| Optical Thickness nd | $0.125\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.25\lambda_0$ | $0.32\lambda_0$ |

*Note: $\lambda_0$ = 1000 nanometers

Figure 6:
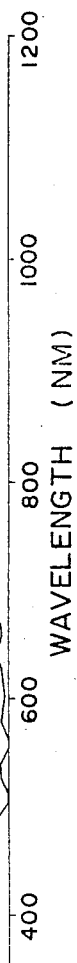
FIG. 6 is a graph showing a normalized reflectance of the beam splitter of FIG. 5, particularly when the incident angle of beam is 45°.
Figure 6:
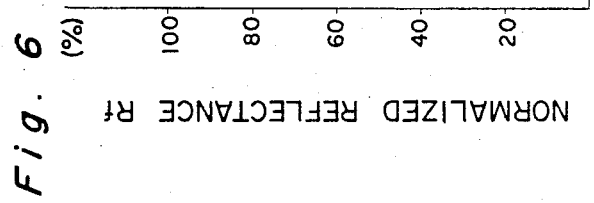

It is to be noted that the base glass plate 60 has a refractive index of 1.5168. Of the thirteen films in the multi-film layer 61, the films having a refractive index of 1.38 as shown in Table 2 are made of $MgF_2$, and the films having a refractive index of 2.30 are made of $TiO_2$ or $CeO_2$. When light rays hit on the beam splitter 7" with an incident angle of 45°, as illustrated in FIG. 5, rays in infrared region reflect with a high percentages, but rays in visible light region reflect with a low percentages, as shown in a graph of FIG. 6, wherein abscissa and ordinate represent, respectively, wavelength in nanometers and normalized reflectance Rf in percentages. More specifically, the reflectance is very low (thus, transmittance is very high) in a visible light range, such as 400-700 nanometers, and is very high (thus, transmittance is very low) in an infrared light range, such as 800-1000 nanometers.

Figure 7:
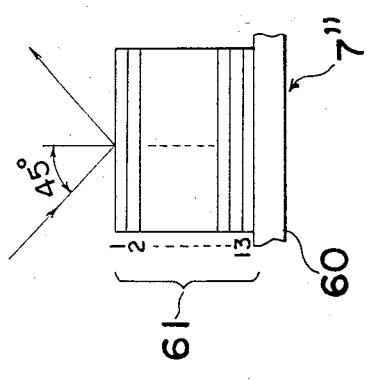
FIG. 7 is a diagrammatic view showing a major portion of optical arrangement employing the beam splitter of FIG. 5.

Referring to FIG. 7, a major portion of the optical arrangement of the focus detecting device employing the beam splitter 7" is shown. In FIG. 7, 62 is a reflection mirror, 8' is an optical element having relay lenses 8'a and 8'b.

It is to be noted that the auto-focusing system according to the present invention can be arranged in different manner than the above described arrangement.

For example, in the beam splitter 7 shown in FIGS. 1a and 1b, the second reflecting face 7b can be so arsecond particular range. The third reflecting face receives and reflects the infrared lights having a wavelength of the second particular range. In this case, two infrared light photoelectric conversion devices should be provided: one for receiving the infrared lights from the second reflecting face; and the other for receiving the infrared lights from the third reflecting face.

Figure 8A:
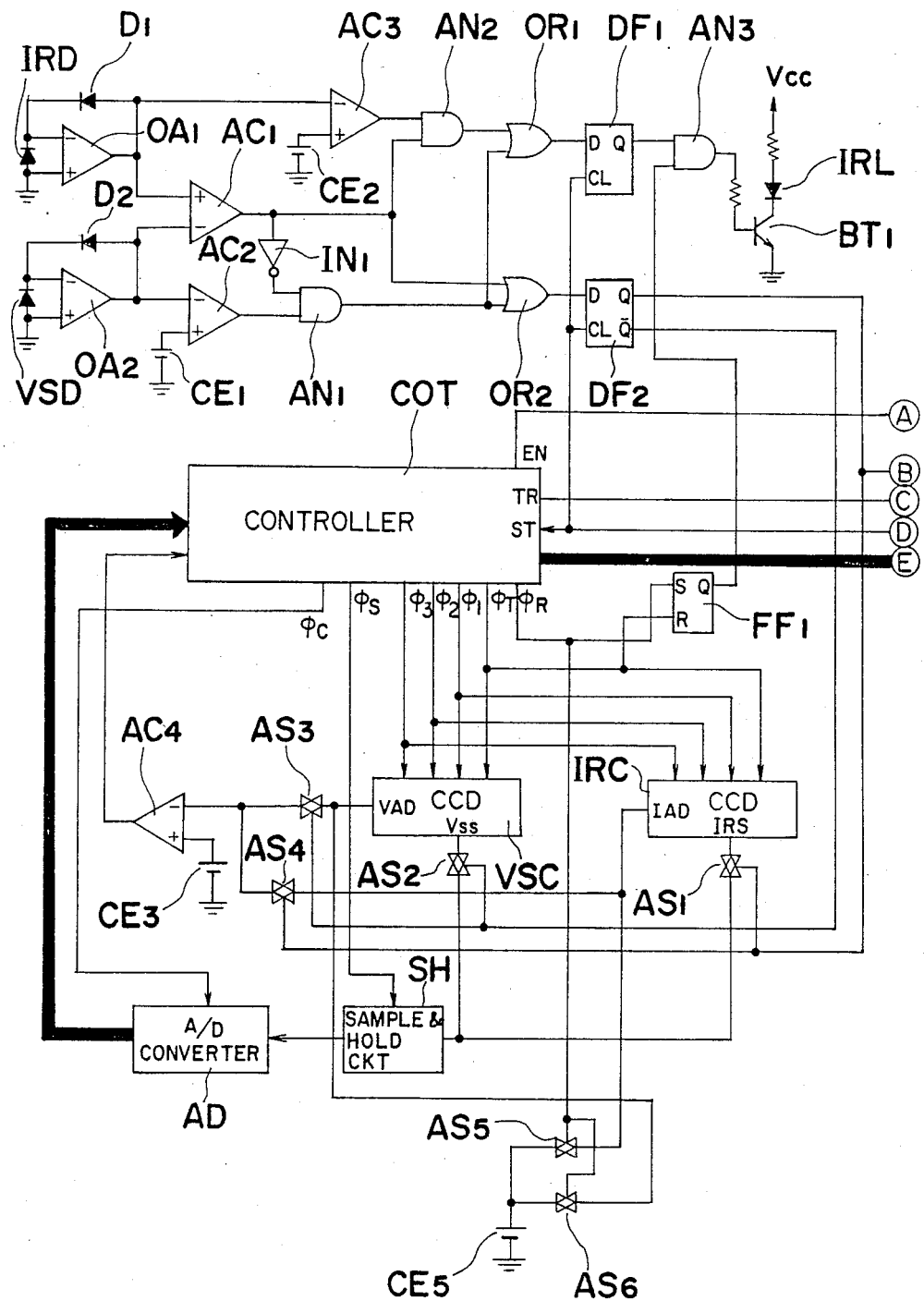
FIGS. 8a and 8b taken together show a circuit diagram of an auto-focusing system according to one embodiment the present invention, wherein characters A–E in FIG. 8a are connected to corresponding characters in FIG. 8b.
Figure 8B:
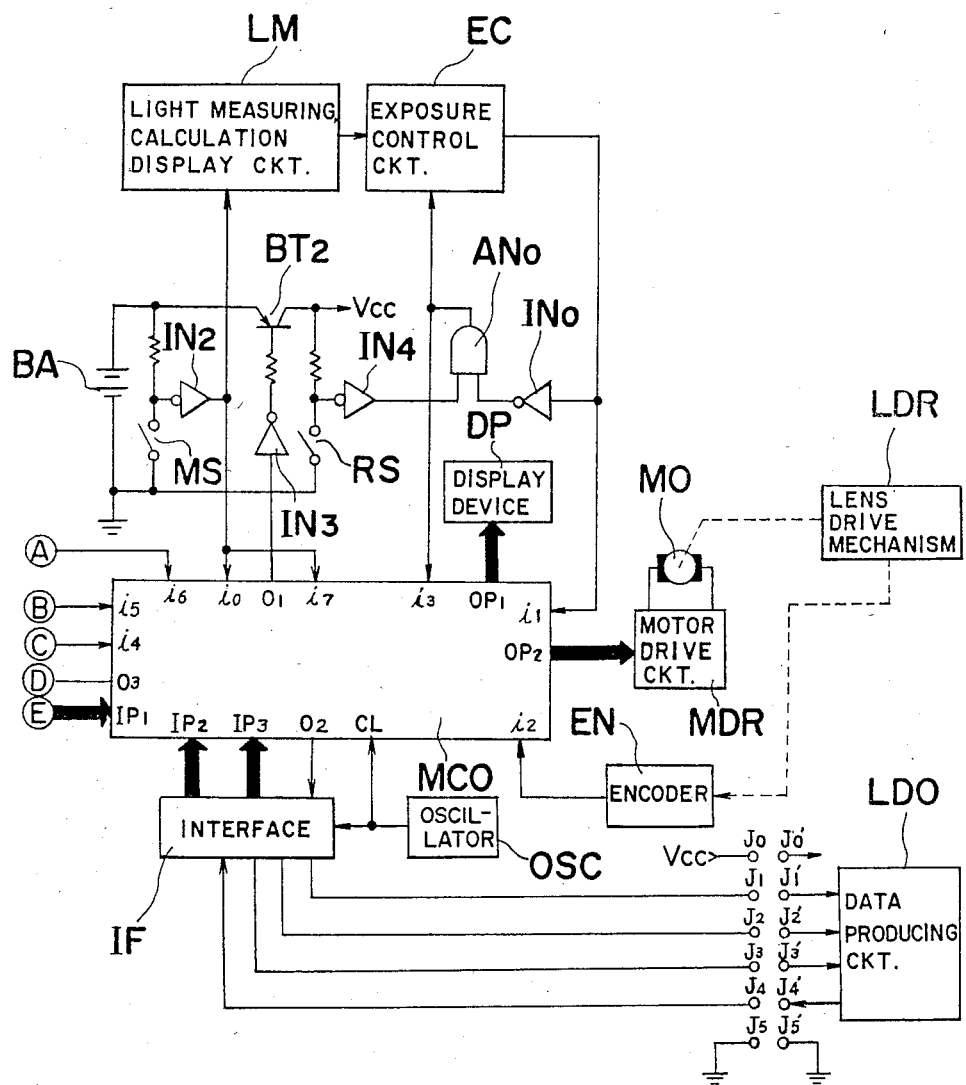

Referring to FIGS. 8a and 8b, a circuit diagram of the auto-focusing system according to one embodiment of the present invention is shown, in which characters A-E in circle in FIG. 8a are connected to corresponding characters in circuit in FIG. 8b.

A reference character IRD at upper left corner of FIG. 8a is a photoelectric conversion element for monitoring infrared lights, and VSD is a photoelectric conversion element for monitoring visible lights. The photoelectric conversion element IRD is provided in the infrared light photoelectric conversion device 9b, shown in FIG. 1a or 1b, and the photoelectric conversion element VSD is provided in the visible light photoelectric conversion device 9a. These photoelectric conversion elements IRD and VSD are coupled with operational amplifiers OA1 and OA2 and logarithmic compression diodes D1 and D2, thereby defining light measuring circuits. The outputs of the operational amplifiers OA1 and OA2 are compared with each other in a comparator AC1. When the output from the amplifier OA1 is greater than that from the amplifier OA2, i.e., when the infrared lights are stronger than the visible lights, the comparator AC1 produces HIGH, and when the output from the amplifier OA2 is greater than that from the amplifier OA1, i.e., when the visible lights are stronger than the infrared lights, the comparator AC1 produces LOW.

The output of the operational amplifier OA1 is also compared with a reference voltage from a constant voltage source CE2 by a comparator AC3. When the output from the operational amplifier OA1 representing the infrared light level is smaller than the reference voltage from the voltage source CE2, the comparator AC3 produces HIGH. But, when the output from the amplifier OA1 is greater than the reference voltage from the voltage source CE2, the comparator AC3 produces LOW.

Likewise, the output of the operational amplifier OA2 is also compared a reference voltage from a constant voltage source CE1 by a comparator AC2. When the output from the operational amplifier OA2 representing the visible light level is greater than the reference voltage from the voltage source CE1, the comparator AC2 produces HIGH. But, when the output from the amplifier OA2 is smaller than the reference voltage from the voltage source CE1, the comparator AC2 produces LOW.

A logic circuit defined by inverter IN1, AND gates AN1 and AN2 and OR gates OR1 and OR2 receives the outputs from three comparators AC1, AC2 and AC3 and selects which one of the two outputs from photoelectric conversion devices 9a and 9b should be used, and determines whether or not an infrared LED for the auxiliary light should be actuated to emit infrared light for the focus detection. A detail of operation of the logic circuit is shown below in Table 3.

device) IRC provided in the infrared light photoelectric conversion device 9b, and turning an analog switches AS2 and AS3 off, cutting signal from a CCD VSC provided in the visible light photoelectric conversion device 9a.

The operation shown in Table 3 under other rows is similar to that described above.

As apparent from Table 3, rows 1 and 2, when ever the output level of infrared light photoelectric conversion element IRD is greater than that from the visible light photoelectric conversion element VSD, infrared light photoelectric conversion device 9b is selected. In this case, if the output level of infrared light photoelectric conversion element IRD is lower than a predetermined level (row 2), the infrared LED IRL is actuated to emit auxiliary light of infrared rays.

Contrary, the visible light photoelectric conversion device 9a is selected only when the output level of visible light photographic conversion element VSD is greater than that from the infrared light photoelectric conversion element IRD and, at the same time, greater than a predetermined level (row 3). When the output level of visible light photographic conversion element VSD is greater than that from the infrared light photoelectric conversion element IRD, but less than the predetermined level (row 4), the infrared light photoelectric conversion device 9b is selected and, at the same time, the infrared LED IRL is actuated to emit auxiliary light of infrared rays.

A further detail of the circuit shown in FIG. 8a will become apparent from the following description.

The output of the OR gate OR1 is connected to D input of data flip-flop DF1, and the output of the OR gate OR2 is connected to D input of data flip-flop DF2. Each of the data flip-flops DF1 and DF2 has a clock terminal CL which is connected to an output O3 of a microcomputer MCO (FIG. 8b). When the microcomputer MCO produces from its output O3 a start measur-

TABLE 3

| | Output levels of Photoelectric Conversion Elements IRD & VSD | AC1 | AC2 | AC3 | IN1 | AN1 | AN2 | OR1 | OR2 | Selected Element IRD or VSD | Infrared LED IRL ON or OFF |
|---|---|---|---|---|---|---|---|---|---|---|---|
| 1 | IRD>VSD+IRD>CE2 | H | $\phi$ | L | L | L | L | L | H | IRD | OFF |
| 2 | IRD>VSD+IRD<CE2 | H | $\phi$ | H | L | L | H | H | H | IRD | ON |
| 3 | VSD>IRD+VSD>CE1 | L | L | $\phi$ | H | L | L | L | L | VSD | OFF |
| 4 | VSD>IRD+VSD<CE1 | L | H | $\phi$ | H | H | L | H | H | IRD | ON |

NOTE:
(1) + means "at the same time".
(2) $\phi$ means "either H or L".

As understood from Table 3, row 1, when the output level of photoelectric conversion element IRD is greater than that from the element VSD and, at the same time, greater than the reference voltage from the voltage source CE2, comparators AC1 and AC3 produces HIGH and LOW, respectively. Thus, the AND gate AN2 produces LOW, and the inverter IN1 produces LOW, thereby producing LOW from the AND gate AN1. Furthermore, OR gate OR1 produces LOW and OR gate OR2 produces HIGH. Thus, when a data flip-flop DF1 receives a clock pulse, its Q output produces LOW. Thus, an AND gate AN3 produces LOW to turn off transistor BT1. As a result, the infrared LED IRL is maintained OFF. Moreover, when a data flip-flop DF2 receives a clock pulse, its Q output produces HIGH, and its Q output produces LOW, thus turning an analog switches AS1 and AS4 on, permitting the transmission of signal from a CCD (charge coupled ing signal for effecting the start of light measuring for the focus detection, data flip-flops DF1 and DF2 latches the data at their D input.

Still referring to FIG. 8a, a reference character COT designates a controller for controlling the light measuring operation for the focus detection, IRC is a CCD provided in the infrared light photoelectric conversion device 9b, and VSC is a CCD provided in the visible light photoelectric conversion device 9a. These CCDs IRC and VSC are provided for the focus detection. A sample-and-hold circuit SH is provided for holding analog signal from either CCD IRC or VSC, and an analog-to-digital converter AD is provided for converting an output of sample-and-hold circuit SH from analog to digital form.

When the start measuring signal, which is a pulse, is applied from output O3 of microcomputer MCO to input ST of controller COT, the controller COT produces from its output θR a reset pulse which is applied to each of analog switches AS5 and AS6, thereby turning the analog switches AS5 and AS6 on. By the turn on of the analog switches AS5 and AS6, each of the CCDs IRC and VSC are charged through terminals IAD and VAD up to a level equal to a constant voltage source CE5. The output ØR is also connected to a set terminal S of a flip-flop FF1. Thus, by a reset pulse produced from the output ØR, the flip-flop FF1 is turned to set condition, thereby producing HIGH from Q output of the flip-flop FF1. This HIGH is applied to AND gate AN3, and if the data flip-flop DF1 is producing HIGH at this moment, the AND gate AN3 produces HIGH, thereby conducting transistor BT1. Thus, the LED IRL emits infrared beams.

The CCDs IRC and VSC receive signals from their own light receiving elements, charge the signals, and produce gradually-increasing voltage signals representing the charged amount in each CCD from their outputs IAD and VAD. In this case, when the data flip-flop DF2 is producing HIGH from its Q output (meaning that CCD IRC of infrared should be used), analog switch AS4 conducts to transmit voltage signal from output IAD of CCD IRC to comparator AC4. On the other hand, when the $\overline{Q}$ output of flip-flop DF2 is producing HIGH, analog switch AS3 conducts to transmit voltage signal from output VAD of CCD VSC to comparator AC4.

The comparator AC4 compares the gradually increasing voltage signal from output IAD or VAD with a reference voltage from a constant voltage source CE3, and when the voltage signal reaches the reference voltage from the voltage source CE3, it produces HIGH which is applied to controller COT. Thereupon, the controller COT produces a transmission pulse from its output ØT, thereby shifting the charge stored in each CCD IRC or VSC to transmission gate. The transmission pulse is also applied to reset terminal R of flip-flop FF1, thereby resetting the flip-flop FF1. Thus, the LED IRL for the auxiliary light stops the infrared light emission. Thereafter, output terminal IRS or VSS of CCD IRC or VSC continuously produce stored charge in accordance with transmission clocks from outputs Ø1, Ø2 and Ø3. In this case, when the data flip-flop DF2 is producing HIGH from its Q output, analog switch AS1 conducts to transmit the signal representing the received infrared light from output IRS to sample-and-hold circuit SH. But, when the data flip-flop DF2 is producing HIGH from its $\overline{Q}$ output, analog switch AS2 conducts to transmit the signal representing the received visible light from output VSS to sample-and-hold circuit SH.

The controller COT produces from its terminal ØS a pulse for effecting the sample-and-hold operation in the circuit SH and, thereafter, produces a pulse from its terminal ØC to AD converter AD for effecting analog-to-digital conversion. Then, controller COT produces from its output TR a pulse to an input i4 of microcomputer MCO for the indication that the data transmission will be carried out. Thereupon, the AD converted data by the AD converter AD is transmitted from controller COT to microcomputer MCO through its inut port IP1. Thereafter, the above described series operation of producing stored charge, sample-and-hold, AD conversion; and data transmission is repeated for a number of times equal to the number of light receiving element in CCD IRC or VSC. When repeated for the required number of times, the controller COT produces from its output EN a pulse indicating the completion of transmission to an input i6 of microcomputer MCO, thereby stopping the repetition.

According to the above description, the determination of which one of the two CCDs should be selected and the determination of whether or not to turn on the LED IRL are carried out by the use of photoelectric conversion elements IRD and VSD. But, both determinations can be done without such elements IRD and VSD. For example, before carrying out the light measuring for the focus detection, the CCDs IRC and VSC are actuated to store charges corresponding to the infrared and visible lights, respectively, and the voltage signals representing the charged amounts, as produced from the outputs IAD and VAD, can be used as output signals from the elements IRD and VSD, or from the amplifiers OA1 and OA2 if such voltage signals have enough high amplitude.

Referring particularly to FIG. 8b, the autofocusing system further includes a battery BA for supplying D.C. power and a manually operable switch MS, such as one provided in association with a shutter release button (not shown) and closes upon depression to a half-way down. The switch MS is connected to an inverter IN2 which, when the switch MS is turned on, produces HIGH, thereby starting the microcomputer MCO to carry out the focus condition detection and focus adjustment and, at the same time, starting a light measuring, calculation and display circuit LM. Also, in response to the closure of the switch MS, the microcomputer MCO produces HIGH from its output 01, thereby producing LOW from an inverter IN3 to turn a transistor BT2 to a conductive state. Thus, D.C. power is supplied to line Vcc.

Another manually operable switch RS is provided, for example in association with a shutter release button, and closes upon depression to its full way. When the switch RS closes, an inverter IN4 produces HIGH. In this case, if an exposure control circuit EC is in a preparatory condition and an inverter IN0 is producing HIGH, AND gate AN0 produces HIGH, thereby stopping the microcomputer to further carry out the focus condition detection and focus adjustment. Then, it is waited until the exposure control stops. Also, when the switch RS closes, the exposure control circuit EC carries out an exposure control operation based on exposure control values from the light-measuring, calculation and display circuit LM. When the exposure control operation completes, the exposure control circuit EC produces HIGH indicating the completion of operation, and applies it to input i1 of the microcomputer MCO. The exposure control circuit EC produces LOW when an exposure control arrangement has completed its charge and when the preparation for the exposure control operation is completed.

A display device DP receives data from an output port OP1 of the microcomputer MCO and displays either one of in-focus, near-focus and far-focus. A motor drive circuit MDR receives data from an output port OP2 and drives a motor MO either in forward or backward direction, thereby operating a lens drive mechanism LDR to shift the lens to an in-focus position. An encoder EN is coupled to lens drive mechanism LDR for producing a pulse each time the lens is shifted for a predetermined unit distance. An interface circuit IF is provided, which takes data necessary for driving the lens from a data producing circuit LDO in response to a pulse from output 02 of microcomputer MCO. The data producing circuit LDO, provided in the interchangeable lens mounted on a camera body, supplies the data S (or data dL) and data K representing the rate of lens shift with respect to a predetermined number of pulses produced from the encoder EN.

Next, a detail of the interface circuit IF and data producing circuit LDO is described with reference to FIGS. 9a and 9b, wherein terminals J1 to J4 provided in a camera body are connectable to corresponding terminals J1' to J4' provided in an interchangeable lens.

Figure 9A:
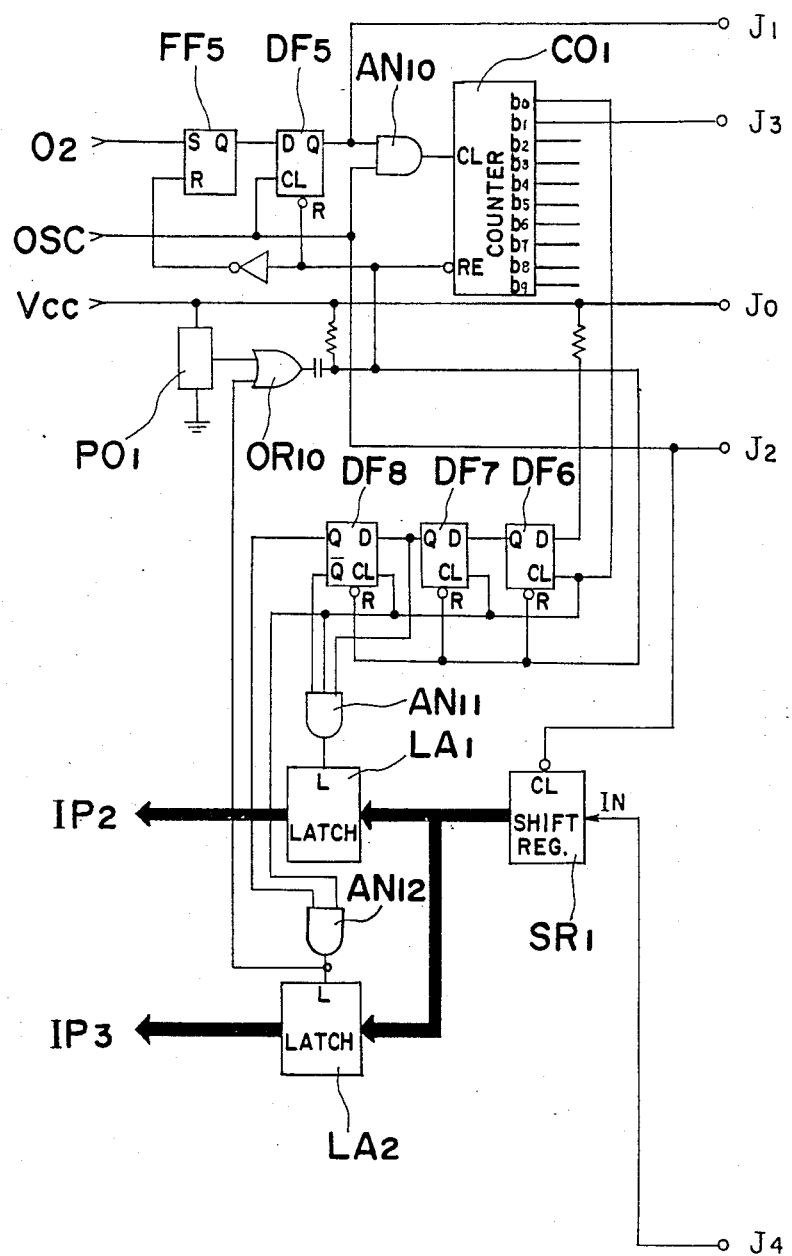
FIG. 9a and 9b taken together show a detailed circuit diagram or circuit and data output circuit shown in FIG. 8b, wherein characters J1–J4 in FIG. 9a are terminals connectable to terminals in FIG. 9b with corresponding characters.

Referring particularly to FIG. 9a, when microcomputer MCO produces HIGH from its output 02, a flip-flop FF5 is set, thereby producing HIGH from Q output of flip-flop FF5. Then, when a clock terminal CL of data flip-flop DF5 receives a clock pulse from oscillator OSC, the data flip-flop DF5 produces HIGH from its Q output. Accordingly, an AND gate AN10 is enabled to transmit a train of clock pulses from oscillator OSC to clock terminal CL of a ring counter CO1. In response to each clock pulse, the ring counter CO1 counts up. More specifically, when the ring counter CO1 has counted one clock pulse, it produces HIGH from its output b0 and produces LOW from the rest of its outputs; when it has counted two clock pulses, it produces HIGH from its output b1 and produces LOW from the rest of its outputs; when it has counted ten clock pulses, it produces HIGH from its output b9 and produces LOW from the rest of its outputs; when it has counted eleven clock pulses, it produces HIGH from its output b0 and produces LOW from the rest of its outputs; and so on.

Figure 9B:
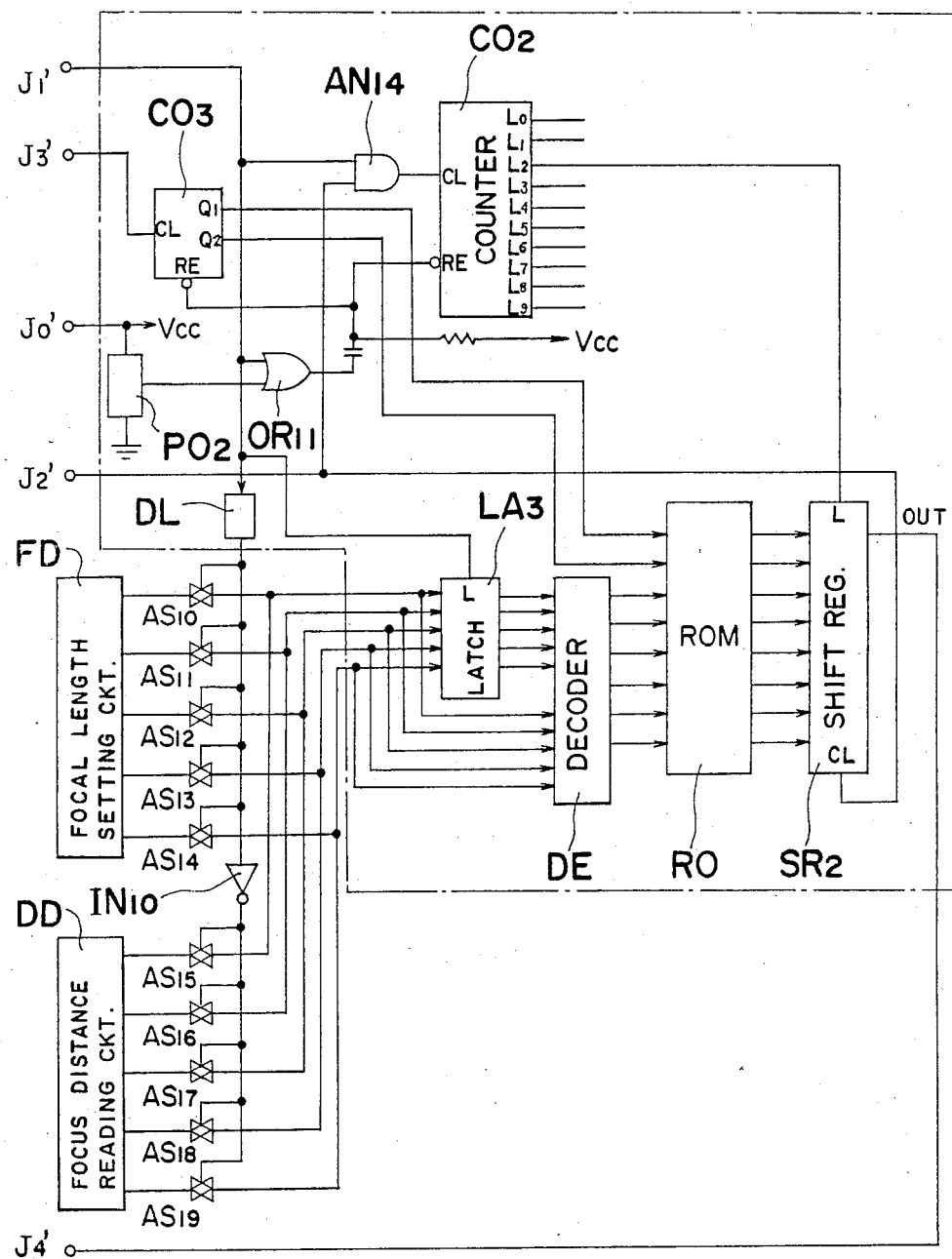

Referring also to FIG. 9b, the Q output of data flip-flop DF5 is also connected through terminals J1 and J1' to the circuit provided in the mounted interchangeable lens. More specifically, the terminal J1' is connected to a latch circuit LA3 which upon receipt of HIGH from the Q output of data flip-flop DF5, latches 5-bit data representing a distance between the object to be photographed and the camera from a focus distance reading device DD through analog switches AS15–AS19. The focus distance reading device DD reads the distance between the object to be photographed and the camera by detecting the shifted position of be objective lens. The terminal J1' is also connected to a delay circuit DL which after a predetermined period from the receipt of HIGH from the Q output of data flip-flop DF5, produces HIGH which is inverted to LOW by an inverter IN10. The HIGH from the delay circuit DL is applied to analog switches AS10–AS15 to turn on the same, and LOW from the inverter IN10 is applied to analog switches AS15–AS19 to turn off the same. Thus, when a HIGH is produced from the delay circuit DL, a decoder DE receives 10-bit signal (5-bit distance data from the latch LA3 and 5-bit focal length data from a focal length setting circuit FD) which is converted to 6-bit signal and applied to a ROM RO at its least significant six bits.

In FIG. 9b, the focus distance reading device DD and focal length setting device FD are each formed by a coded plate (not shown) and a portion enclosed by a dot-dash line can be formed in a single IC chip. According to the arrangement shown in FIG. 9b, it is possible to transmit 10-bit signal from the devices DD and DF to the IC chip through only six lines: five lines extending from the latch LA3; and one line extending from the delay circuit DL, resulting in fewer connections between the IC chip and its associated circuit. Furthermore, the circuit shown in FIG. 9b is particularly designed for the employment in an interchangeable lens having data S (or data dL) and data K which vary with respect to the change of focusing distance and focal length. Therefore, signals representing these two variants as produced from the devices DD and FD are converted by the decoder DE into 6-bit signal to be applied to the ROM RO at its least significant six bits.

Moreover, the Q output of data flip-flop DF5 is connected through terminals J1 and J1' to AND gate AN14. Thus, the AND gate AN14 is enabled upon receipt of HIGH from the data flip-flop DF5, thereby permitting the supply of clock pulses from the oscillator (FIG. 9a) through the terminal J2 and J2' to a ring counter CO2, which operates in the same manner as the above-described ring counter CO1.

When the ring counter CO1 receives second clock pulse to its clock terminal CL, it produces HIGH from its output b1 for the first time. Accordingly, a counter CO3 (FIG. 9b) connected to the output b1 of the counter CO1 through terminals J3 and J3' counts up to one, thereby producing a 2-bit signal "01" from its outputs Q1 and Q2. These outputs Q1 and Q2 of the counter CO3 are connected to two most significant bit terminals of ROM RO. Thus, in this case, the ROM RO receives an 8-bit signal "01XXXXXX" (XXXXXX is a 6-bit output from decoder DE.) which is an address for designating a location in ROM RO where data S (or dL) corresponding to the detected focus distance and set focal length is stored. Then, when output L2 of ring counter CO2 produces HIGH, the designated data S (or dL) defined by a plurality of bits, such as 8 bits, in ROM RO is transferred parallelly to a shift register SR2. Thereafter, in a synchronized relation with the clock pulses from the terminal J2', the data S (or dL) is sent out bit-by-bit in response to the positive edge of each clock pulse from a terminal OUT of the shift register SR2, and is transferred though the terminals J4' and J4 to a shift register SR1 provided in interface circuit IF in a camera body. The shift register SR1 stores the data S (or dL) bit-by-bit in response to the negative edge of each clock pulse from the oscillator OSC. Therefore, the storing of the data S (or dL) in the shift register SR1 starts synchronized relation to the negative edge of a pulse produced from terminal b2 of the ring counter CO1 and ends in synchronized relation to the negative edge of a pulse produced from terminal b9 of the ring counter CO1.

Thereafter, when terminal b0 of the ring counter CO1 produces HIGH for the second time, a data flip-flop DF7 produces HIGH from its Q output. At this moment, a data flip-flop DF8 is producing HIGH from its $\overline{Q}$ output, an AND gate AN11 is enabled to produce HIGH from terminal b0 of ring counter CO1. And, in response to the positive edge of HIGH produced from AND gate AN11, a latch LA1 stores data S (or dL) from shift register SR1.

Then, while terminal b1 of the ring counter CO1 is producing HIGH for the second time, this HIGH is applied through terminals J3 and J3' to counter CO3 which then produces "10" from its outputs Q1 and Q2. Thus, in this case, the ROM RO receives an 8-bit signal "10XXXXXX" which is an address for designating a location in ROM RO where data K corresponding to the read focus distance and set focal length is stored. Then, in response to the positive edge of a pulse produced from output L2 of ring counter CO2, the designated data K is transferred to shift register SR2. Thereafter, in a synchronized relation with the clock pulses from the terminal J2', the data K is sent out bit-by-bit in response to the positive edge of each clock pulse from a terminal OUT of the shift register SR2, and is transferred though the terminals J4' and J4 to a shift register SR1 provided in interface circuit IF in a camera body. The shift register SR1 stores the data K bit-by-bit in response to the negative edge of each clock pulse from the oscillator OSC. Therefore, the storing of the 8-bit data K in the shift register SR1 starts in synchronized relation to the negative edge of a pulse produced from terminal b2 of the ring counter CO1 and ends in synchronized relation to the negative edge of a pulse produced from terminal b9 of the ring counter CO1.

Thereafter, when terminal b0 of the ring counter CO1 produces HIGH, a data flip-flop DF8 produces HIGH from its Q output. Therefore, an AND gate AN12 is enabled to produce HIGH from terminal b0 of ring counter CO1. And, in response to the positive edge of HIGH produced from AND gate AN12, a latch LA2 stores data K from shift register SR1. The HIGH from AND gate AN12 is also applied through an OR gate OR10 to reset terminal of each of flip-flop FF5, data flip-flops DF5, DF6, DF7 and DF8 and ring counter CO1, thereby resetting these circuits. When the data flip-flop DF5 is reset, its Q output produces LOW which is applied through terminals J1 and J1' and OR gate OR11 to reset terminal of each of counters CO2 and CO3, thereby resetting these counters.

The above described operation is carried out to provide necessary data S (or dL) and data K to the interface circuit IF of the camera body, and through input ports IP2 and IP3 to microcomputer MCO. And, whenever the condition of focus distance or focal length changes, the above described operation is repeated to renew the necessary data S (or dL) and data K.

In FIGS. 9a and 9b, reference characters PO1 and PO2 designate power-on-reset circuit, and each produces a reset signal when a power is supplied from a power supply line Vcc in response to the conduction of transistor BT2. The reset signal produced from the power-on-reset circuit PO1 is applied to OR gate OR10, and in response to the negative edge of the reset signal, each of flip-flop FF5, data flip-flops DF5, DF6, DF7 and DF8 and ring counter CO1 is reset. And, the reset signal produced from the power-on-reset circuit PO2 is applied to OR gate OR11, and in response to the negative edge of the reset signal, each of counters CO2 and CO3 is reset.

Figure 10:
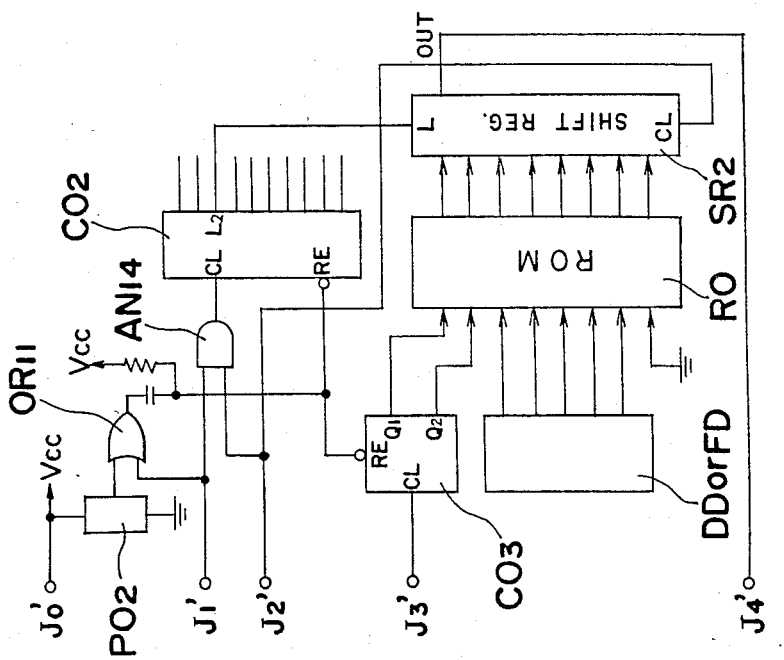

Referring to FIG. 10, a circuit which is a modification of the circuit of FIG. 9b is shown, and is arranged such that the data S (or dL) and data K vary with respect to the change of either one of focus distance or focal length. According to the circuit shown in FIG. 10, the ROM RO has its two most significant bits of 8-bit inputs connected to counter CO3, the least significant bit connected to ground, and the remaining five bits connected to focus distance measuring device DD or focal length setting device FD, which ever is provided in the circuit. The remaining parts and the operation of the circuit of FIG. 10 is similar to that described above in connection FIG. 9b.

Figure 11:
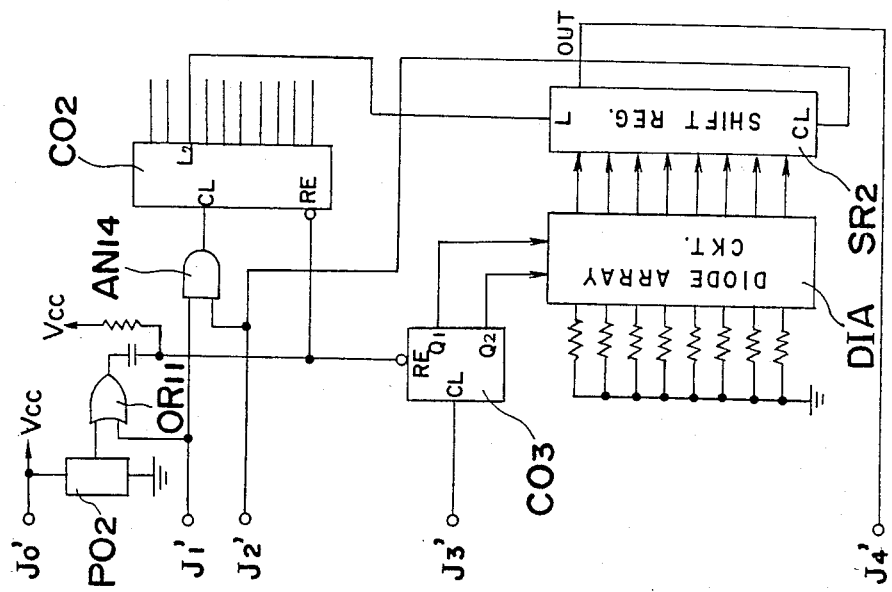
FIGS. 10 and 11 are circuit diagrams showing modifications of the circuit shown in FIG. 9b.

Referring to FIG. 11, a circuit which is a further modification of the circuit of FIG. 9b is shown. According to this modification, a circuit DIA defined by diode arrays is provided in place of ROM RO. When output Q2 of counter CO3 produces HIGH, a diode array provided in circuit DIA and connected to the output Q2 is so actuated as to produce a signal representing data S (or dL). And, when output Q1 of counter CO3 produces HIGH, another diode array provided in circuit DIA and connected to the output Q1 is so actuated a to produce a signal representing data K. The remaining circuit of FIG. 11 is the same as that shown in FIG. 9b.

Next, the operation of the circuit of FIGS. 8a and 8b will be described with reference to a flow chart of FIGS. 12a and 12b. While the manual switch MS is turned off, microcomputer MCO is in a "HALT" condition consuming a very low electric power. When the switch MS is turned on, a HIGH produced from inverter IN2 is applied to an interruption terminal 10, whereby the microcomputer MCO starts to operate from step #0. At step #0, a HIGH is produced from output terminal 01, thereby producing a LOW from inverter IN3. Thus, transistor BT2 conducts to supply electric power to power supply line Vcc. Then, at step #1, it is discriminated whether or not switch RS is turned on, by the discrimination of signal at the input i3. When the switch RS is turned off, input i3 receives LOW from inverter IN4 through AND gate AN0. But if switch RS is turned on, input i3 receives HIGH from inverter IN4. When input i3 is receiving HIGH, i.e., when switch RS is on, the program advances to step #41 for the exposure control as will be described later. Contrary, when input i3 is receiving LOW, i.e., when switch RS is off, output 03 produces HIGH, at step #2 for starting the light measuring operation for the focus detection. Then, at step #3, output 02 produces HIGH to fetch data S (or dL) and data K from the mounted interchangeable lens.

Then, at step #4, it is waited until input i4 receives HIGH. When input i4 receives HIGH, data (of A-D converted value of charge in CCD VSC or IRC by one light receiving element) from controller COT is read into microcomputer MCO through input port IP1, at step #5. At step #6, it is discriminated whether input i6 is receiving HIGH. If input i6 is receiving LOW, the program returns back to step #4 for reading next data (of A-D converted value of charge in CCD VSC or IRC by another light receiving element). Contrary, if input i6 is receiving HIGH, as occurred when data of A-D converted value of charge in CCD VSC or IRC by all the light receiving elements is read in, the program advances to step #7. At step #7, it is discriminated whether or not input i3 is receiving HIGH, in the same manner as step #1. If input i3 is receiving HIGH, the program jumps to step #41. If not, then the program proceeds to step #8. At step #8, data S (or dL) is read in through input port IP2, and at step #9, data K is read in through input port IP3. Then, at step #10, an amount of defocus (out of focus) of the image formed on a CCD, and also a direction of defocus are calculated using data received through input port IP1. A manner for carrying out this calculation is disclosed, for example, in U.S. Pat. No. 4,333,007 patented June 1, 1982 to Langlais et al., or in Japanese Patent Laid-open Publication (Tokkaisho) No. 57-45510.

Then, at step #11, it is discriminated whether input i5 is receiving HIGH or not. If input i5 is receiving HIGH, it is understood that the defocus signal dF (representing the amount and direction of defocus) is calculated using output from CCD IRC provided in the infrared light photoelectric conversion device 9b. Therefore, microcomputer MCO carries out a calculation:

$$K \cdot (dF - dL) = N$$

using deflection data dL for correcting defocus signal dF and rate K which are obtained from ROM RO.

If input i5 is not receiving HIGH, it is understood that the defocus signal dF is calculated using output from CCD VSC provided in the visible light photoelectric conversion device 9a. In this case, microcomputer MCO carries out a calculation:

$$K \cdot dF = N$$

using defocus signal dF without correction and rate K.

It is to be noted that the calculated result N in the above two equations indicates a number of pulses to be produced from encoder EN to shift the mounted lens to the properly infocused position.

Then, at step #14, the focus condition is indicated through display device DP. And, at step #15, it is discriminated whether or not input i3 is receiving HIGH for discriminating whether the switch RS is turned on or not, in the same manner described above. At step #16, it is discriminated whether the number N is equal to zero or not. If it is zero, the program jumps to step #38, which will be described later. If not, the program advances to step #17 for setting the number N in register M in microcomputer MCO. Then, at step #18, motor drive circuit MDR is actuated to start motor MO in forward or backward direction determined by dF, and then a data PO is set up in a register P in microcomputer MCO, at step #19. Then, it is discriminated at step #20 whether or not input i2 receives HIGH pulse from encoder EN. If input has received HIGH, the program advances to step #21, and if not, advances to step #27.

At step #27, it is discriminated whether or not input i3 is receiving HIGH to discriminate whether switch RS is closed or not. If input i3 is receiving HIGH, it is understood that an exposure control operation will be carried out. In this case, motor MO is stopped at step #31, and a flag JF in microcomputer MCO is reset, and then, the program advances to step #41. Contrary, if input i3 is receiving LOW, "1" is subtracted from the content of register P (step #28) and, thereafter, it is discriminated whether the content of register P is zero (step #29). If not equal to zero, the program advances to step #30 at which it is discriminated whether flag JF is carrying zero or not. If flag JF is carrying zero, the program returns to step #20 to repeat the discrimination whether input i2 receives HIGH pulse from encoder EN. But, if the flag JF is not carrying zero, the program advances to step #25 at which it is discriminated whether or not input i2 is receiving LOW. If input i2 is receiving LOW, the program again goes to step #27. The above operation is repeatedly carried out until input i2 receives HIGH. If input i2 fails to receive HIGH before the content of the register P becomes zero, i.e., before a predetermined period of time, it is understood that the lens is unable to move any further because it is already shifted to one extreme end. In this case, motor MO is stopped at step #33, and a warning is displayed (step #34). Then, flag JF is reset at step #35 and then program advances to step #38.

Returning back to step #20, if input i2 receives a HIGH pulse from encoder EN, the content of the register M, which is now N, is subtracted "1" (step #21). Then, it is discriminated whether the content of the register is equal to zero or not (step #22). If not, "1" is set in flag JF (step #23) and a data PO is set up in register P (step #24). Then, it is discriminated whether input i2 receives LOW, i.e., whether the HIGH pulse ends or not (step #25). If it is discriminated that the HIGH pulse has ended, the program advances to step #26 to reset flag JF and, thereafter, it returns back to step #19.

In the foregoing description, the content of register M is subtracted by "1" only when it is discriminated that input i2 receives HIGH, i.e., in response to the positive edge of a pulse from encoder EN. Instead, according to one modification, the number N may be doubled and the content of register M is subtracted by "1" also when it is discriminated that input i2 receives LOW, i.e, in response not only to the positive edge, but also to the negative edge of a pulse from encoder EN. In this case, a discrimination step same as the step #22 should be added between steps #25 and #26 for the discrimination whether the content of the register M is equal to zero or not. If it is equal to zero, the program advances to step #36, as in the case of step #22 to end the lens adjustment, as will be described below. When this modification is employed, the lens position can be adjusted more precisely to the infocus position.

At step #22, if it is discriminated that the content of register M is equal to zero, it is understood that the lens is shifted to the infocus position. Therefore, at step #36, motor MO is stopped and, at step #37, it is indicated through display device DP that the lens is shifted to the infocus position.

At step #38, it is discriminated whether manual switch MS is on or not, by the discrimination of whether input i7 is receiving HIGH or not. If input i7 receives HIGH as occurs when manual switch MS turns on, the program returns back to step #1 to repeat the above described operation. Contrary, if input i7 receives LOW, display device DP is turned off at step #39 and LOW is produced from output O1 to turn transistor BT2 off, thereby cutting the supply of electric power to power supply line Vcc, and returning microcomputer MCO again to "HALT" condition. Also, if it is discriminated at step #1 that switch RS is turned off, it is waited at step #41 until input i1 receives HIGH. Then, after completing the exposure control operation and when input i1 receives HIGH pulse from exposure control circuit EC, the program advances to step #38.

Next, the description is directed to modifications of the above described embodiment.

As mentioned before, the photoelectric conversion element for the focus detection can be formed by diode arrays which respond immediately to the light, instead of an integration type which respond gradually to the light, such as ROM RO.

Also, according to the above description, the data dF is calculated using digital value, which is an A/D converted value of output signal from photoelectric conversion element. Instead, it is possible to calculate the data dF using analog value from the photoelectric conversion element, and the calculated result may be converted to digital form for the motor control and display.

Figure 13:
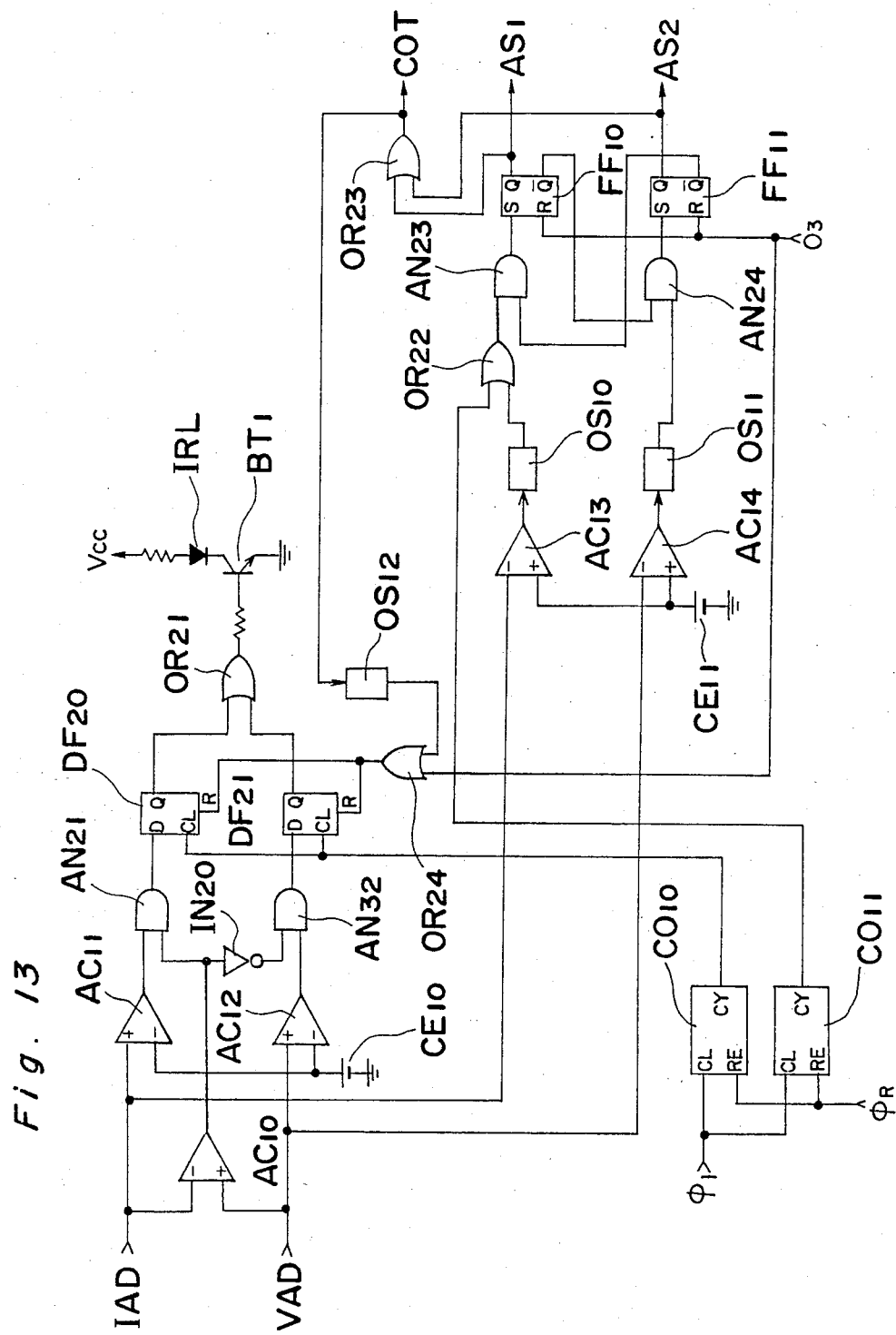
FIG. 13 is a circuit diagram showing a major portion of an auto-focusing system according to another embodiment the present invention.

Referring to FIG. 13, another embodiment of the present invention is shown. According to this embodiment, the photoelectric conversion elements IRD and VSD are eliminated, and CCDs IRC and VSC are used for obtaining signals which determine whether to use the auxiliary light, or not, and which determine which one of the two signals from CCDs IRC and VSC is to be used.

A counter CO10 is reset by a reset pulse $\emptyset R$, counts up by clock pulse $\emptyset 1$, and produces a pulse from its carry terminal after, e.g., 40 msec. When this pulse is produced, the signals produced from outputs IAD and VAD from CCDs IRC and VSC are compared with each other in comparator AC10 and are each compared with a reference voltage from constant voltage source CE10 in comparators AC11 and AC12, and the compared signals are applied to logic circuit defined by AND gates AN21 and AN32 and inverter IN20. Furthermore, the outputs from AND gates AN21 and AN32 are stored in data flip-flops DF20 and DF21.

If the compared results are such that IAD is smaller than VAD (meaning that the infrared light is stronger than visible light) and IAD is smaller than a predetermined level CE10 (meaning that the infrared light is stronger than a predetermined level), or that IAD is equal to or greater than VAD (meaning that the infrared is not stronger than visible light) and VAD is weaker than the predetermined level CE10 (meaning that visible light is stronger than the predetermined level), both AND gates AN21 and AN22 produce LOW, thereby storing LOW in both data flip-flops DF20 and DF21. In this case, OR gate OR21 continues to produce LOW, thereby preventing LED IRL from emitting infrared light. In the above given situation, since both outputs from CCDs IRC and VSC reach the predetermined level CE10 before counter CO10 counts the time, e.g., 40 msec, the charge to CCDs can be completed within a predetermined period of time, such as 80 msec.

Contrary, if the compared results are such that IAD is smaller than VAD (meaning that the infrared light is stronger than visible light) and IAD is equal to or greater than a predetermined level CE10 (meaning that the infrared light is not stronger than a predetermined level), or that IAD is equal to or greater than VAD (meaning that the infrared is not stronger than visible light) and VAD is equal to or greater than the predetermined level CE10 (meaning that visible light is not stronger than the predetermined level), both AND gates AN21 and AN22 produce HIGH, thereby storing LOW in both data flip-flops DF20 and DF21. In this case, OR gate OR21 produces HIGH, thereby emitting infrared light from LED IRL. In the above given situation, an infrared light is emitted because, if CCD continues to charge without an auxiliary infrared light, the charging may not complete within a predetermined period of time, such as 80 msec., resulting in a long period of time for the focus detection.

When a signal level from outputs IAD or VAD reaches the reference voltage level of constant voltage source CE11, comparator AC13 or AC14 produces HIGH, thereby producing a HIGH pulse from one-shot circuit OS10 or OS11. Before producing a HIGH pulse from one-shot circuit OS10 or OS11, flip-flops FF10 and FF11 are both in reset condition. Therefore, a $\overline{Q}$ terminal of each flip-flop FF10 or FF11 is producing HIGH, thereby enabling AND gates AN24 and AN23.

When a HIGH pulse is produced from one-shot circuit OS10, it is transmitted through OR gate OR22 and AND gate AN23 to flip-flop FF10, thereby changing the flip-flop FF10 to set condition. Accordingly, flip-flop FF10 produces HIGH from its $\overline{Q}$ output which is applied to controller COT though OR gate OR23 and also to analog switch AS1, and LOW from its Q output which is applied to AND gate AN24, thereby disabling AND gate AN24 to cut any HIGH pulse from one-shot circuit OS11. Thus, flip-flop FF11 continues to produce LOW from its Q output and HIGH from its $\overline{Q}$ output. This condition is maintained until a reset pulse is produced from output 03 of microcomputer MCO.

Contrary, when a HIGH pulse is produced from oneshot circuit OS11, flip-flop FF11 is turned to set condition and flip-flop FF10 is maintained in reset condition, thereby providing HIGH to controller COT and analog switch AS2.

In the above described operation, when controller COT receives HIGH from OR gate OR23, controller COT produces a transmission pulse ∅T which is applied to CCDs VSC and IRC. Furthermore, in the above operation, when HIGH is applied to analog switch AS1, CCD IRC is selected for use in focus detection, and when HIGH is applied to analog switch AS2, CCD VSC is selected for use in focus detection. In this way, a CCD which is charged to a predetermined level first is selected to be used in focus detection.

An output of OR gate OR23 is also connected to a one-shot circuit OS12 which produces a HIGH pulse when OR gate OR23 produces HIGH. The HIGH pulse from one-shot circuit OS12 is transmitted through OR gate OR24 to a reset terminal of data flip-flops DF20 and DF21. Accordingly, if LED has been emitting infrared light, the light emission stops when data flip-flops DF20 and DF21 resets.

A counter CO11 is reset by a reset pulse ∅R from controller COT, and counts a predetermined period of time, such as 80 msec., by the count of clock pulses ∅1 and produces a pulse from its carry terminal when counting has completed. If both comparators AC13 and AC14 are producing LOW at a moment when a pulse is produced from the counter CO11, the pulse from the counter CO11 is applied through OR gate OR22 and AND gate AN23 to set terminal of flip-flop FF10. Thus, flip-flop FF10 produces HIGH from its Q output, thereby actuating the controller COT to produce a transmission pulse ∅T and, at the same time, selecting CCD IRC provided in the infrared light photoelectric conversion device 9b. The above described operation is carried out when the object is relatively dark such that CCD fails to charge up to a predetermined level within 80 msec. In this case, the charging is forcibly ended at the end of counting 80 msec. Furthermore, since LED IRL emits infrared light under this operation, it is more likely that CCD IRC for the infrared light produces a higher output level than that from CCD VSC for the visible light. Therefore, under this operation, it is so arranged that CCD IRC is selected.

Figure 14:
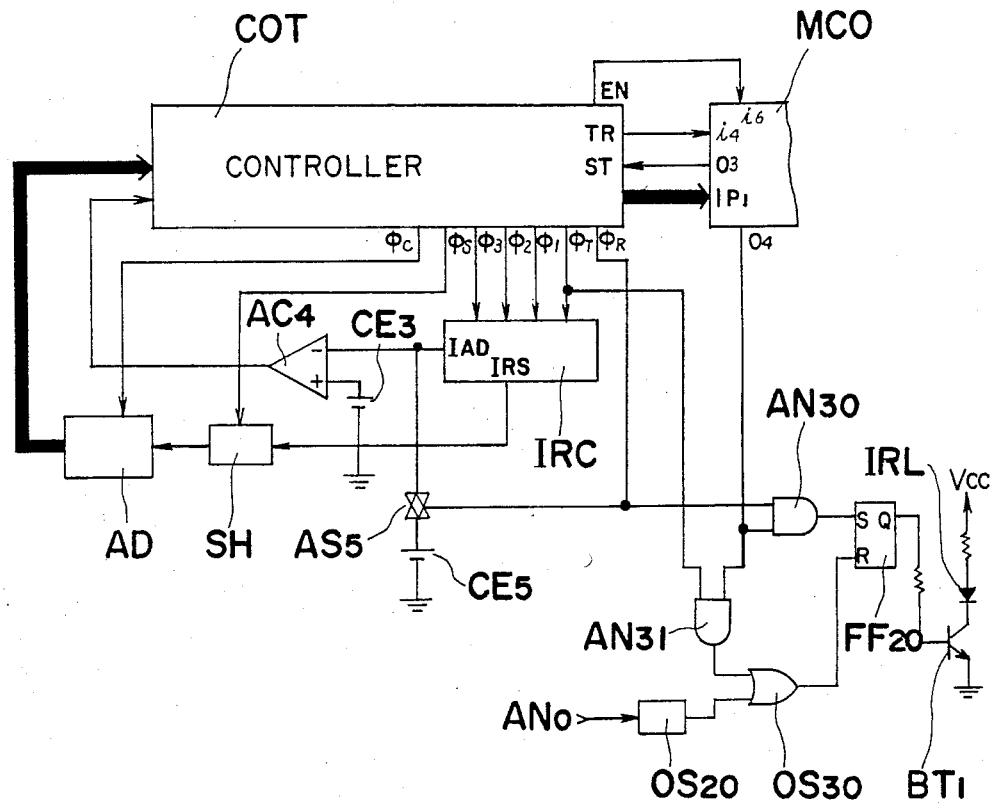
FIG. 14 is a circuit diagram showing a major portion of an auto-focusing system according to yet another embodiment the present invention.

Referring to FIG. 14, yet another embodiment of the present invention is shown. When compared with the first embodiment shown in FIGS. 8a and 8b, this embodiment has no photoelectric conversion elements IRD and VSD, and has only one CCD IRC, which is sensitive to infrared light. Furthermore, LED emits infrared light only when it is so determined that the data dF, calculated by the use of output from CCD IRC, is unreliable due to low contrast.

An operation of the auto-focusing system of FIG. 14 is described hereinbelow.

Figure 12A:
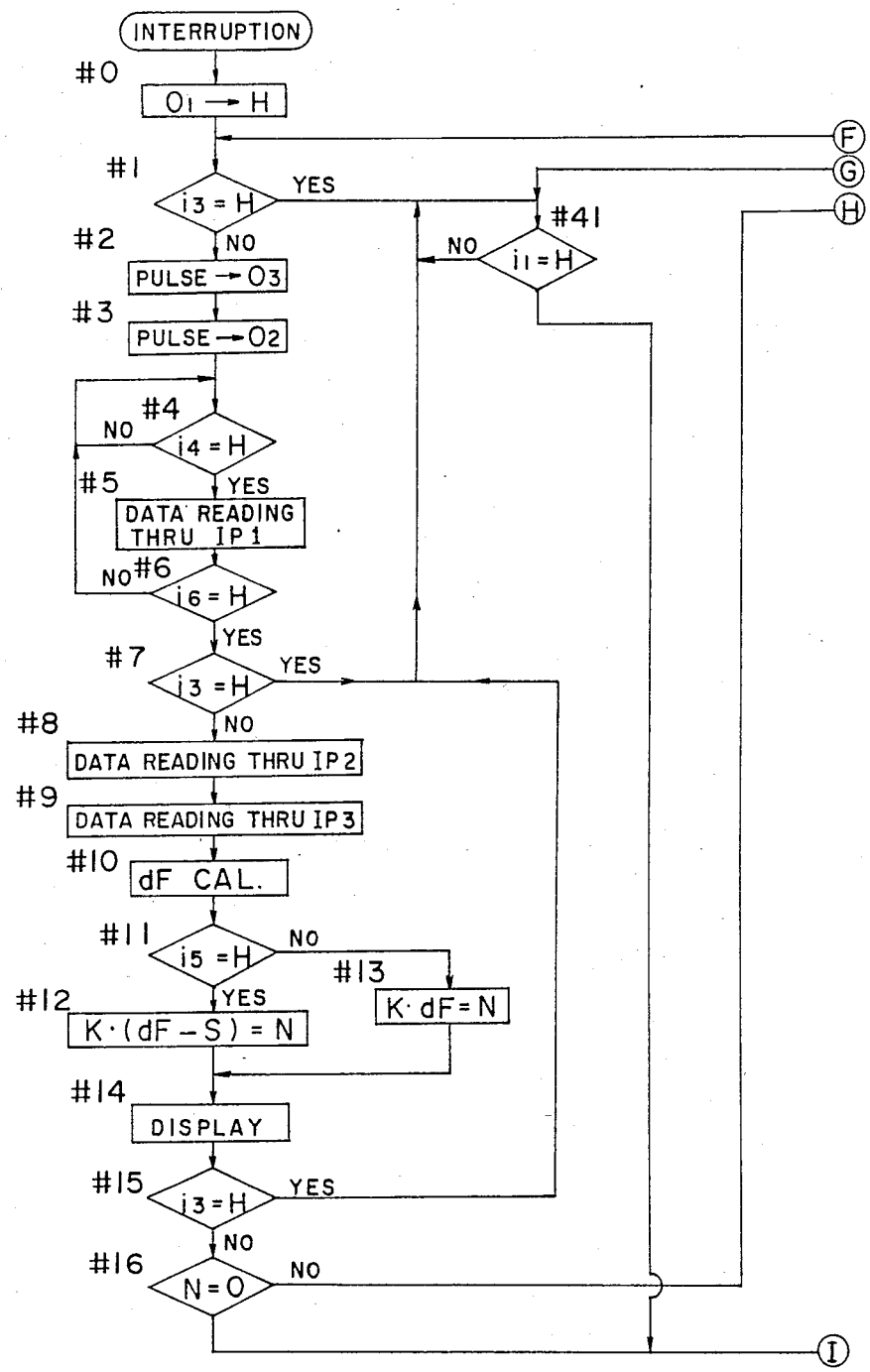
FIGS. 12a and 12b taken together show a flow chart of the auto-focus detection carried out by the circuit of FIGS. 8a and 8b, wherein characters F-I in FIG. 12a are connected to corresponding characters in FIG. 12b.
Figure 12B:
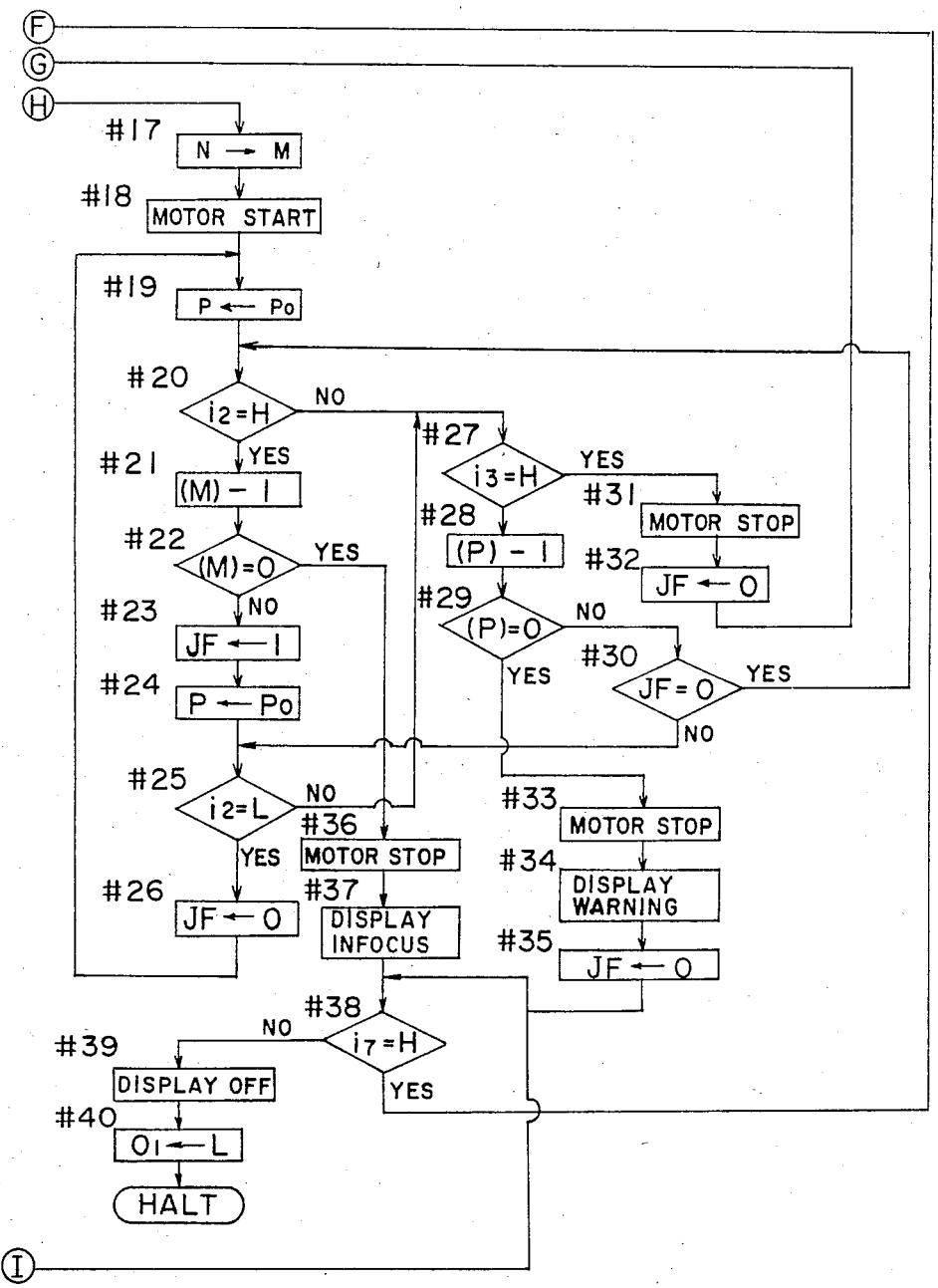
Figure 15:
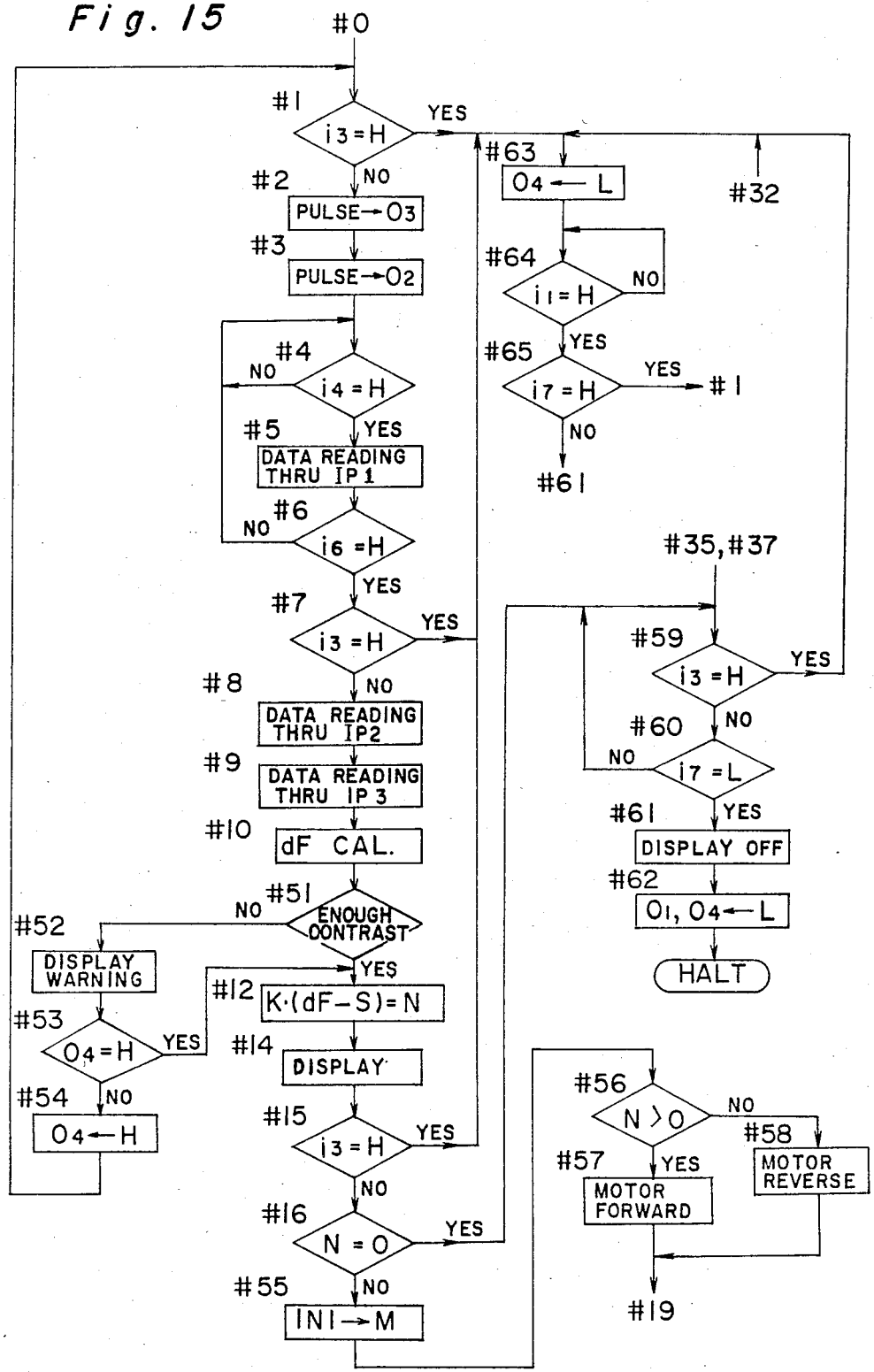
FIG. 15 is a flow chart of the auto-focus detection carried out by the circuit of FIG. 14.

Referring also to FIG. 15 showing a flow chart of operation by the circuit of FIG. 14, the steps up to step #10 is the same as those shown in FIG. 12a and, therefore, data dF is calculated using output signal from CCD IRC for the infrared light. Thus, the data dF is equal to amount and direction of defocus based on the infrared light. Then, at step #51, it is discriminated whether or not a data of contrast as obtained through a calculation carried out in step #10 is above a predetermined level. If the contrast data is below a predetermined level, the program advances to step #52 for producing a warning signal because the obtained data dF is unreliable. Then, at step #53, it is discriminated whether output 04 of microcomputer MCO is producing HIGH, or not. If output 04 is producing HIGH, it is understood that the data dF has been calculated with the aid of auxiliary infrared light. Therefore, in this case, there is no need to calculate the data dF again with the aid of auxiliary infrared light, because there will be hardly any difference in the newly calculated result. In this case, the program advances to step #12.

Contrary, if output 04 is not producing HIGH, HIGH is produced from output 04 and, thereafter, the program returns back to step #1 to repeat the light measurement by the CCD IRC under the auxiliary infrared light and the calculation of data dF.

While output 04 is producing HIGH to enable AND gate AN30 (FIG. 14), a reset pulse produced from output $\emptyset$R is applied to set terminal of flip-flop FF20. Thus, flip-flop FF20 produces HIGH from its Q output effecting an emission of infrared light. Thereafter, when a transmission pulse is produced from output $\emptyset$T, this pulse is applied through AND gate AN31 and OR gate OR30 to reset terminal of flip-flop FF20. Thus, flip-flop FF20 produces LOW from its Q output stopping the emission of infrared light.

Next, at step #12, amount and direction of rotation of motor MO is calculated using data dF, data S (or dL) and data K, as described earlier. Then, after carrying out steps #14–#16, which are the same as those shown in FIG. 12a, the program advances to step #55. A program including steps #55–#58 indicates the same operation of steps #17 and #18 shown in FIG. 12a, but in more details. At step #55, data N representing an amount of rotation of motor MO is stored in register M. At step #56, it is discriminated whether N is smaller than zero or not. If it is smaller than zero, motor MO is driven forward direction. If it is greater than zero, motor MO is driving backwardly. Thereafter, the program advances to step #19.

When the focus adjustment operation through steps #16, #35 and #37 completes, the program advances to step #59 at which it is discriminated whether switch RS is turned on or not. If switch RS is not turned on, it is further discriminated whether switch MS is turned off by the discrimination whether input i7 is receiving LOW. If input i7 is not reiving LOW, the above described operation is repeated, and when input i7 receives LOW, display device DP is disabled, and LOW is produced from each of outputs 01 and 04, thereby returning microcomputer MCO to HALT condition. Therefore, according to the flow chart shown in FIG. 15, when one cycle of focus adjustment operation completes, it is necessary to open the switch MS to start a new cycle of focus adjustment operation.

Furthermore, when it is discriminated that output i3 is producing HIGH as a result of closure of switch RS, output 04 produces LOW at step #63, and it is waited, after the completion of exposure control operation, until input i1 receives HIGH. When i1 receives HIGH, it is discriminated whether or not input i7 is receiving HIGH as a result of closure of switch MS. If input i7 is receiving HIGH, the program returns back to step #1, thereby repeating the focus adjustment operation. If input i7 is receiving LOW, the program advances to step #61 to end the operation.

It is to be noted that in FIG. 14, if switch RS closes to produce HIGH from AND gate AN0, a one-shot circuit OS20 produces a HIGH pulse which is applied through OR gate OR30 to a reset terminal of flip-flop FF20. Accordingly, LOW is produced from Q output of flip-flop FF20 to stop the emission of infrared light.

Figure 16:
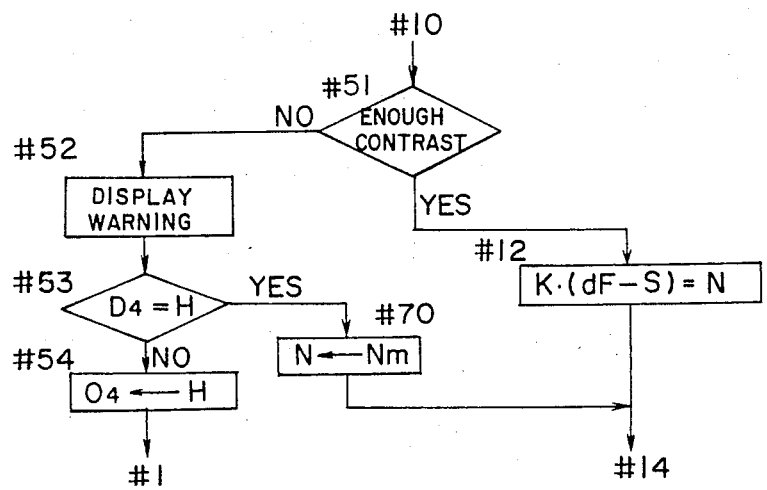
FIG. 16 is a flow chart similar to FIG. 15, but showing only a modified portion.

Referring to FIG. 16, there is shown a flow chart which is a modification of the flow chart shown in FIG. 15. If it is discriminated at step #51 that the image lacks contrast, and when it is discriminated that data dF is calculated with an aid of auxiliary light at step #53, it is understood that the situation in this case is such that the object to be photographed is located very far from the camera. In this case, data Nm is set for the amount and direction of rotation of motor MO to shift the lens to the infinite focusing position. Thereafter, the program advances to step #14.

According to the modification of FIG. 14, only a CCD IRC, which is sensitive to infrared light, is necessary for the optical arrangement of focus detection. From this view point, the circuit of FIG. 1a can be simplified such that photoelectric conversion device 9a may be deleted, or beam splitter 7 can be replaced with a filter which cuts lights other than infrared light, and the transmitted infrared light is relayed through a suitable relay lens to CCD IRC.

According to the modification described above in connection with FIG. 14, infrared beam is emitted when an object has a low contrast, such as when aiming at a plain wall with a single color. In this case, the purpose for emitting infrared beam is to present a contrast around the spot receiving infrared beam. To this end, the spot on which the infrared beam impinges, or at least a border line of the lit spot should be included in an area for the focus detection. Therefore, the diameter of the infrared beam for the above described modification should be made smaller than that for the embodiments shown in FIGS. 8a and 8b and FIG. 3.

Figure 17:
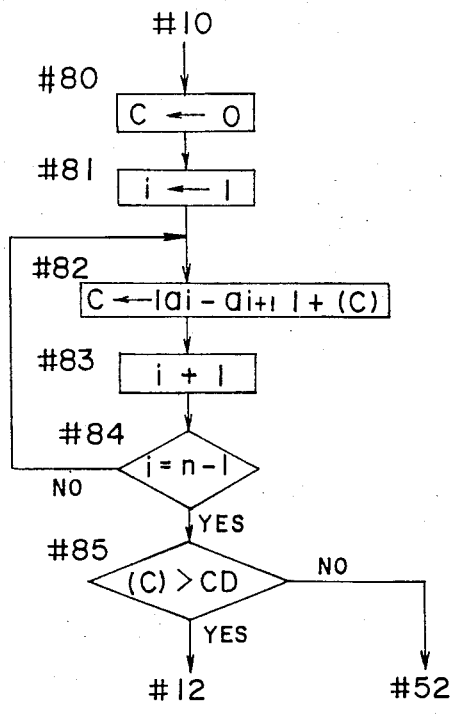
FIG. 17 is a flow chart showing a detail of a step #51 of FIG. 15 or 16 for the detection of contrast.

Referring to FIG. 17, a detailed flow chart of step #51 shown in FIGS. 15 and 16 for determining whether the contrast is low or not is shown. At step #80, a register C in microcomputer MCO is reset to "0", and at step #81, a register i is stored with "1". Then, at step #82, an absolute value of a difference between output ai from ith light receiving element and output ai+1 from (i+1)th light receiving element, which is substantially equal to the contrast difference between the two neighboring light receiving elements, is added with the content of register C and the sum is stored in the same register C. Thus, register C is now storing:

$$|ai - ai+1|.$$

At step #83, "1" is added to the content of register i, and at step #84, the content of the register i is compared with a number n (n is equal to the number of the total light receiving elements). If, the content of register i is smaller than n-1, the program returns back to step #82, thereby repeating the steps #82 and #82. Thus, the contrast differences between the two neighboring light receiving elements are added for n−1 times. When the content of the register i becomes equal to n−1, the program advances to step #85. At this step, the content of the register C is storing:

$$|a1-a2| + |a2-a3| + \ldots \\ + |an-2-an-1| + |an-1-an|,$$

which represents the contrast of the image.

At step #85, it is discriminated whether the content of the register C carrying a sum of the above formula is greater than a predetermined value CD or not. If the content of the register C is greater than the value CD, this means that the image has an enough contrast. In this case, the program advances to step #12. Contrary, if the content of the register C is not greater than the value CD, this means that the contrast is relatively low and, therefore, the program goes to step #52.

Figure 18:
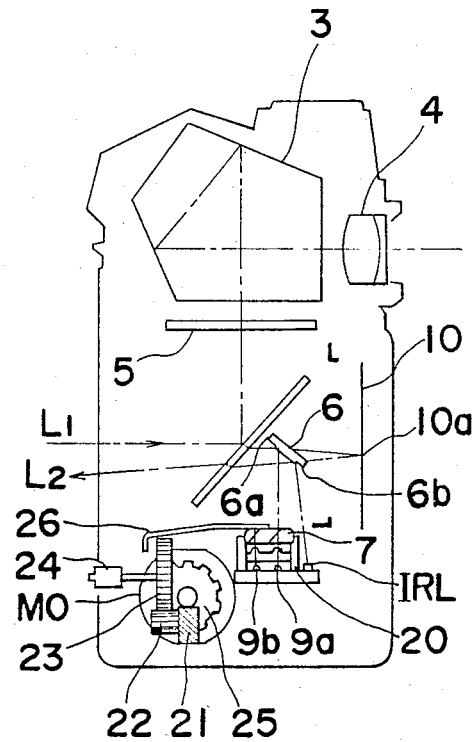
FIG. 18 is a diagrammatic view of a camera installed with a device for emitting infrared rays to an object to be photographed.

Referring to FIG. 18, an example of an optical arrangement for installing infrared LED IRL is shown. Submirror 6 has two reflection faces 6a and 6b which are slightly slanted with each other. Light ray L1 reflected from an object to be photographed and passing though the picture taking lens reflects on reflection face 6a and impinges on beam splitter 7. Infrared LED IRL is mounted on a base plate on which the beam splitter 7 is provided. Infrared light ray L2 emitted from LED IRL reflects on reflection face 6b, passes through main mirror 1 and picture taking lens, and directs to an object to be photographed.

It is to be noted that the light rays L1 and L2, when extended through submirror 6, intersect with each other at a point 10a on film surface 10. Accordingly, infrared LED IRL is installed as if light beam L2 is emitted from point 10a. Furthermore, emitted light beam L2 hits on a spot which is the same as the spot for the focus detection.

It is also to be noted that, from a practical point of view, reflection faces 6a and 6b may not be so precisely arranged as to intersect light rays L1 and L2 exactly on the point 10a, but should be so arranged as if light ray L2 emits not from the point 10a but from a point within a spot for the focus detection.

Figure 19:
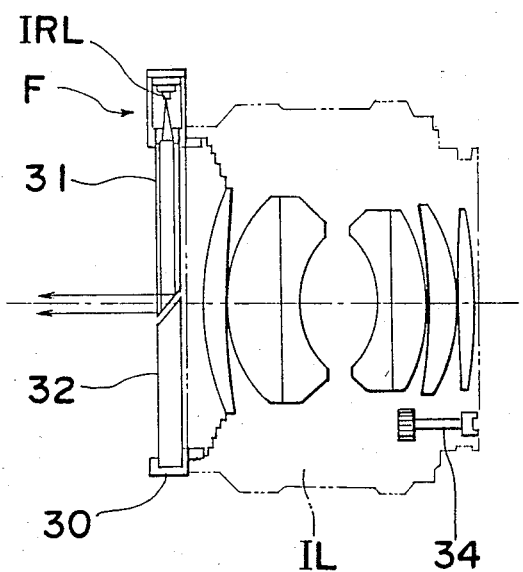
FIG. 19 is a diagrammatic view of an interchangeable lens installed with a device for emitting infrared rays to an object to be photographed.

Furthermore, according to the arrangement shown in FIG. 18, a plate 20 is provided for holding beam splitter 7 and for intercepting infrared light beam from LED IRL, thereby preventing the infrared light from LED IRL from being directly impinged on the photoelectric conversion devices 9a and 9b. Reference numerals 21, 22 and 23 designate a gear arrangement for reducing the speed and transmitting the driving force of motor MO, and 24 is an actuator integrally provided to gear 23. When an interchangeable lens is mounted on a camera, actuator 24 engages a shaft 34 (FIG. 19). Thus, when actuator 24 rotates shaft 34, the focusing position of the lens is changed, thereby carrying out the focus adjustment. Furthermore, 25 designates a rotating plate defining encoder EN, and 26 designates a separation plate for separating the camera into a dark space and a lower space for intalling gears and motor MO. Separation plate 26 has an opening for the path of light beam from LED IRL and light beam into the beam splitter.

Moreover, according to the arrangement shown in FIG. 18, relay lens 8a and 8b are both integrally formed by a transparent plastic and are held by plate 20 together with beam splitter 7.

Figure 20:
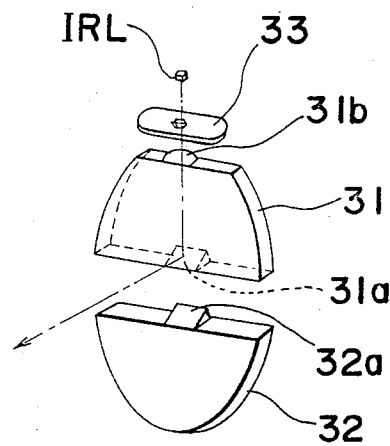
FIG. 20 is a diagrammatic exploded view of a filter employed in the interchangeable lens of FIG. 19, particularly showing an arrangement for emitting infrared rays.

Referring to FIGS. 19 and 20, another example of an optical arrangement for installing infrared LED IRL is shown. Instead of the camera body, LED IRL is provided in a filter F, which can be detachably mounted on an interchangeable lens at its end remote from the camera-body receiving end. Filter F comprises a frame 30 having a threaded cylinder portion for engagement with the lens and a pair of filter plates 31 and 32 which are mold-formed by acrylic resin and each having a configuration of a halfcircle. Filter plates 31 and 32 have, respectively, recessed face 31a and projecting face 32a which are slanted 45° to the flat face of the filter plates. Filter plates 31 and 32 are accommodated in frame 30 with faces 31a and 32a parallelly facing each other with a small air gap therebetween. Filter plate 31 has a lens 31b formed thereon on opposite side of recessed face 31a. Filter F also has an aperture plate 33 and infrared LED IRL. The infrared beam emitted from the LED IRL passes through aperture plate 33, serving as F-stop, and lens 31b reflects totally at face 31a, thereby emitting infrared beam from the center of the filter F and in alignment with the axis of the lens.

According to the arrangement shown in FIGS. 19 and 20, since there is no or very little angular difference between the projecting beam from the camera to the object and reflected beam from the object to the camera, there will be no parallax observed between the projecting and receiving beams. Furtermore, since the recess 31a, as well as the projection 32a, can be formed very small, it has little or no affect on the focus detection or on the exposure operation.

Referring now to FIG. 21, an auto-focusing system according a further embodiment of the present invention is shown. The auto-focusing, according to the auto-focusing system of FIG. 21 is done by the contrast detection, and this method is disclosed, e.g., in U.S. Pat. No. 4,341,953 patented July 27, 1983 to Sakai et al, in Japanese Patent Laid-open Publication (Tokkaisho) No. 57-72110 or in Tokkaisho No. 57-88418. A focus detection calculation circuit 13' shown in FIG. 21 is provided to produce only the direction of defocus. When an image is blur because of front-focus, a terminal Ta produces HIGH, and when it is so because of rear-focus, a terminal Tc produces HIGH. And, when an image is properly focused, a terminal Tb produces HIGH. Based on these HIGH signals, a display DP' viewable through the viewfinder indicates a focused condition whether it is in front-focus, rear-focus or infocus condition. Terminals Ta and Tc are also connected to AND gates AN40 and AN41, respectively, and terminal Tb is connected to an inverting input of both AND gates AN40 and AN41. Motor drive circuit MDR is connected to an output of AND gate AN40 and also to an output of AND gate AN41 through OR gate OR40. When AND gate 40 produces HIGH from its output, motor drive circuit MDR is so actuated as to drive the motor MO in, e.g., forward direction, thereby shifting the lens to infinite focus position. Contrary, when OR gate OR40 produces HIGH from its output, motor drive circuit MDR is so actuated as to drive the motor MO in, e.g., reverse direction, thereby shifting the lens to near focus position. Furthermore, when AND gate AN40 or OR gate OR40 stops producing HIGH to supply LOW from both AND gate AN40 and OR gate OR40, motor drive circuit MDR immediately stops the motor MO, thereby stopping the lens shift.

A one-shot circuit OS40 produces a HIGH pulse in response to HIGH from terminal Tb, thereby setting flip-flop FF40. Thus, flip-flop FF40 produces HIGH from its Q output. Furthermore, the HIGH pulse from one-shot circuit OS40 is applied to counter CO40, thereby resetting the counter CO40, which is provided for counting the number of pulses from encoder EN, to zero. A digital comparator DC compared the tput of counter CO40 with data S (or dL) stored in a data reading circuit DR as obtained from data output circuit LDO provided in an interchangeable lens. When two signals match with each other, comparator DC produces LOW which is applied to AND gate AN42. An output of AND gate AN42 is connected to OR gate OR 40. Furthermore, the output of comparator DC is connected to one-shot OS41. Thus, in response to the change of output from comparator DC from HIGH to LOW, one-shot circuit OS41 produces HIGH to reset flip-flop FF40.

The auto-focusing system according to the embodiment shown in FIG. 21 operates as follows. When focus detection is started by infrared light, and when circuit 13' produces HIGH from its output terminal Ta, AND gate AN40 produces HIGH, thereby turning the motor MO forwardly to effect the lens shift toward infinite focus position. Then, when the lens is shifted to a position at which the image formed by infrared light properly focuses on a predetermined image forming plane, terminal Ta produces LOW and, at the same time, terminal Tb produces HIGH. Thus, one-shot circuit OS40 produces a HIGH pulse, thereby setting flip-flop FF40. Thus, flip-flop FF40 produces HIGH from its output Q. Thus, the motor MO is turned in the reverse direction to effect the lens shift toward near-focus position. This lens shift is detected by encoder EN and counter CO40 and, when the lens shift is effected for a required amount determined by the data S (or dL) stored in data reading circuit DR, comparator DC produces LOW, thereby producing LOW from AND gate AN42 and OR gate OR40. Since, at this moment, AND gate AN41 is producing LOW, motor drive circuit MDR receives LOW from OR gate OR40, thereby immediately stopping the motor MO.

It is to be noted that when comparator DC changes its output, from HIGH to LOW, one-shot circuit OS41 produces HIGH, thereby resetting flip-flop FF40. Thus, flip-flop FF40 produces LOW from its Q output, thereby disabling AND gate AN42.

In contradistinction to the above, when focus detection is started by infrared light, and when circuit 13' produces HIGH from its output terminal Tc, both AND gate AN41 and OR gate OR40 produce HIGH, thereby turning the motor MO reversely to effect the lens shift toward near focus position. Then, when the lens is shifted to a position at which the image formed by infrared light properly focuses on the predetermined image forming plane, terminal Tc produces LOW and, at the same time, terminal Tb produces HIGH. Accordingly, AND gate AN41 produces LOW, but AND gate AN42 produces HIGH, because flip-flop FF40 produces HIGH from its Q output due to the HIGH pulse produced from one-shot circuit OS40. Thus, OR gate OR40 continues to produce HIGH. Accordingly, motor drive circuit MDR continues to drive the motor MO in the reverse direction. Thus, the lens shifts past the position for properly focusing an image by infrared light. The amount of lens shift past said position is detected by encoder EN and counter CO40 and, when the lens is shited for a required amount determined by the data S (or dL) stored in data reading circuit DR, comparator DC produces LOW, thereby immediately stopping the lens in the same manner described above.

By the above described operation, the picture taking lens is shifted to a position at which the image formed by visible light focuses properly on the predetermined image forming plane, thereby completing the correction of the deflection dL.

In contrast to the embodiments described above in connection with FIGS. 8a, 8b, 13 and 14 offering a one-step control system, the lens, according to the embodiment described above in connection with FIG. 21, is controlled in two steps. First, the lens is shifted to a quasi-infocus position basd on the focus detection carried out by the infrared light. Secondly, by the use of a signal representing the data S (or dL) as obtained from data output circuit IDO provided in the mounted interchangeable lens, the lens is further shifted to a true-infocus position for the visible light. This two-step control system can be applied to the previous embodiments of FIGS. 8a, 8b, 13 and 14, as described below.

In the embodiments described above in connection with FIGS. 8a, 8b, 13 and 14, focus detection is carried out by a so-called phase difference detecting system. When the two-step control system is employed, the lens is first shifted to a quasi-infocus position based on the defocus signal dF as obtained from focus detection calculation circuit 13 and, thereafter, the lens is further shifted in accordance to the signal S (or dL) to the true-infocus position for the visible light. More specifically, the lens is first shifted until encoder EN produces $N1=K.dF$ pulses. Thereafter, the lens is further shifted until encoder EN produces $N2=K.dL$ pulses. Accordingly, in total, the lens is shifted by a distance $N=N1-N2=K(dF-S)$, which is substantially equal to the distance of lens shift carried out in one-step control system.

In any one of the above described embodiments, various changes and modifications can be adapted. For example, beam splitter 7 can be eliminated when the focus condition detection is carried out based on only infrares light. In this case, an infrared light pass filter should be provided between submirror 6 and photoelectric conversion device 9b for transmitting only the infrared light to device 9b. When this arrangement is employed, it is not necessary to take the optical length d/n for the infrared light between first and second reflecting faces 7a and 7b into consideration. Therefore, data output circuit 16 needs to produce only the deflection signal dL.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. In an auto-focusing system for use in a camera which includes:

a camera body;

an interchangeable lens detachably mounted on said camera body and having an objective lens;

a predetermined image-forming plane for which said objective lens is to be adjusted to focus visible light thereon;

infrared light measuring means for measuring infrared light having passed through said objective lens to form an infrared light image at said image-forming plane;

focus condition detecting means for detecting, based on the measurement by said infrared light measuring means, the focus condition of the infrared light image on said image-forming plane, and for producing a focus signal indicating the detected focus condition;

data producing means for producing a deflection signal indicating a difference between an image-forming distance of said objective lens for infrared light and that for visible light;

calculation means for calculating, using said focus signal and deflection signal, the focus condition of a visible light image formed by said objective lens on said image-forming plane, and for producing a drive signal corresponding to the focus condition of the visual light image thus calculated; and drive means for driving said objective lens in accordance with said drive signal, thereby shifting said objective lens to a position for properly focusing said visible light on said image-forming plane, said data producing means comprising:

first transmitting means for transmitting digital signals from said camera body to said interchangeable lens;

address data producing means provided in said interchangeable lens for producing address data in accordance with said digital signals;

a ROM provided in said interchangeable lens for storing, at a location specified by said address data, deflection signal data intrinsic to said interchangeable lens;

second transmitting means for transmitting said deflection signal from said interchangeable lens to said camera body; and storing means provided in said camera body for storing said deflection signal.

2. In an auto-focusing system for use in a camera having a camera body and an interchangeable lens detachably mounted on said camera body, said interchangeable lens comprising:

an objective lens;

receiving means for receiving digital signals fed from said camera body to said interchangeable lens;

address data producing means for producing address data in accordance with said digital signals received by said receiving means;

a ROM for storing, at a location specified by said address data, deflection data indicating a difference between an image-forming distance of said objective lens for infrared light and that for visible light, said data being intrinsic to said interchangeable lens; and transmitting means for transmitting said deflection data stored at said location of said ROM from said interchangeable lens to said camera body.

3. An interchangeable lens as claimed in claim 2, further comprising focal length data producing means for producing digital data representing the set focal length of said objective lens, said ROM further storing different deflection data for different focal lengths at different addresses, and said address data producing means producing combined address data in accordance with said digital signals received by said receiving means and said focal length data produced by said focal length data producing means, whereby said ROM produces different deflection data for different focal lengths.

4. An interchangeable lens as claimd in claim 2, further comprising focusing distance data producing means for producing digital focusing distance data between a target object and said camera, said ROM further storing different deflection data for different focusing distances at different addresses, and said address data producing means producing combined address data in accordance with said digital signals received by said receiving means and said focusing distance data produced by said focusing distance data producing means, whereby said ROM produces different deflection data for different focusing distances.

5. An auto-focusing system comprising:
an objective lens;
a predetermined image-forming plane for which said objective lens is to be adjusted to focus visible light thereon;

infrared light measuring means for measuring infrared light having passed through said objective lens to form an infrared light image at said image-forming plane;

focus condition detecting means for detecting, based on the measurement by said infrared light measuring means, the out-of-focus direction of the infrared light image on said image-forming plane, and for producing a focus signal indicating said direction;

first drive means for driving said objective lens in a direction determined by said focus signal until said focus signal disappears, thereby positioning said objective lens to a position for properly focusing said infrared light on said image-forming plane;

data producing means for producing a deflection signal indicating a difference between an image-forming distance for infrared light and that for visible light; and second drive means for driving said objective lens based on said deflection signal, thereby shifting said objective lens to a position properly focusing said visible light on said image-forming plane.

6. In an auto-focusing system for use in a camera having a camera body and an interchangeable lens detachably mounted on said camera body, said interchangeable lens comprising:

an objective lens;

receiving means for receiving a signal fed from said camera body to said interchangeable lens;

storing means for storing deflection data indicating a focusing error due to aberration of said objective lens, said deflection data being intrinsic to said interchangeable lens; and transmitting means for transmitting the deflection data stored in said storing means to said camera body in accordance with said signal received by said receiving means.

7. An interchangeable lens as claimed in claim 6, further comprising means for producing focal length data representing the set focal length of said objective lens, said storing means further storing different deflection data for different focal lengths, and said transmitting means transmitting the deflection data specified by said focal length data to said camera body in accordance with said signal received by said receiving means.

8. An interchangeable lens as claimed in claim 6, further comprising means for producing focusing distance data representing the set focusing distance, said storing means further storing deflection data for different focusing distances, and said transmitting means transmitting the deflection data specified by said focusing distance data to said camera body in accordance with said signal received by said receiving means.

9. A system for auto-focusing an interchangeable lens mounted to a camera body, wherein said camera body comprises:

focus condition detecting means for detecting a focus condition of said interchangeable lens by light measurement through said interchangeable lens to generate a defocus digital signal representative of the amount and direction of defocus of said image formed on a predetermined image-receiving plane with respect to a properly focused image thereon;

drive means for effecting auto-focusing of said interchangeable lens;

means for sequentially reading auto-focusing digital data from said interchangeable lens, said auto-focusing digital data representative of a variety of autofocusing factors of said interchangeable lens and intrinsic to said interchangeable lens;

calculating means for calculating data representing the amount of drive to be effected by said drive means from said defocus digital data from said focus condition detecting means and said auto-focusing digital data from said reading means;

means for determining the direction of drive to be effected by said drive means in accordance with the direction of defocus represented by said defocus digital data;

means for producing data corresponding to the amount of drive actually effected by said drive means; and means for stopping said drive means when data from said calculating means and data from said data producing means represents a predetermined relationship with respect to each other;

and wherein said interchangeable lens comprises:

an optical system adapted to be driven by said drive means for a change-of-focus condition;

a ROM storing said auto-focusing digital data, said auto-focusing digital data stored in said ROM including:

(a) deflection data indicating a focusing error due to optical aberration of said interchangeable lens, and (b) conversion coefficient data for converting the amount of defocus represented by said defocus digital data into the amount of drive to be effected by said drive means for effecting auto-focusing of said interchangeable lens;

means for sequentially designating addresses of said ROM for sequential output of said auto-focusing digital data including said conversion coefficient data and said deflection data; and means for transmitting said auto-focusing digital data sequentially output from said ROM to said camera body for sequential reading of said auto-focusing digital data by said reading means.

10. A system as claimed in claim 9, wherein said camera body further comprises means for producing first and second digital signals, and wherein said interchangeable lens further comprises means for receiving said first and second digital signals, said first signal received by said receiving means causing said address designating means to designate an address of said ROM where said deflection is stored while said second digital signal received by said receiving means causing said address designating means to designate an address of said ROM where said conversion coefficient data is stored.

11. A system as claimed in claim 10, wherein said interchangeable lens is a zoom lens and further comprises means for producing digital data corresponding to a set focal length of said zoom lens, and wherein said ROM includes a set of addresses for storing various conversion coefficients corresponding to various zoom lens focal lengths as said conversion coefficient data while said address designating means is adapted to designate said set of addresses in accordance with combinations of said second digital signal and said digital data from said digital data producing means.

12. A system as claimed in claim 10, wherein said interchangeable lens is a zoom lens and further comprises means for producing digital data corresponding to a set focal length of said zoom lens, and wherein said ROM includes a set of addresses for storing various deflection data corresponding to various zoom lens focal lengths while said address designating means is adapted to designate said set of addresses in accordance with combinations of said first drgital signal and said digital data from said digital data producing means.

13. A system as claimed in claim 12, wherein said ROM further includes another set of addresses for storing various conersion coefficients corresponding to various zoom lens focal lengths as said conversion coefficient data while said address designating means is adapted to designate said another set of addresses in accordance with combinations of said second digital signal and said digital data from said digital data producing means.

14. In a system for auto-focusing an interchangeable lens mounted to a camera body which includes focus condition detecting means for detecting the amount and direction of a defocus of an image formed on a predetermined image-receiving plane with respect to a properly focused image thereon and drive means for effecting auto-focusing, said interchangeable lens comprising:

an optical system adaed to be driven by said drive means to effect a change-of-focus condition;

means for receiving digital signals produced serially from said camera body;

a ROM storing various data intrinsic to said interchangeable lens and including:

(a) deflection data indicating a focusing error due to an optical aberration of said interchangeable lens, and, (b) conversion coefficient data for converting the amount of defocus detected by said focus condition detecting means into the amount of drive to be effected by said drive means for effecting auto-focusing of said interchangeable lens;

means for sequentially designating addresses in said ROM in accordance with said digial signals for sequential output of said various data including said conversion coefficient data; and means for sequentially transmitting said various data sequentially output from said ROM to said camera body.

15. An interchangeble lens as claimed in claim 14, wherein said interchangeable lens is a zoom lens and further comprises means for producing digital data corresponding to a set focal length of said zoom lens, and wherein said ROM includes a set of addresses for storing various conversion coefficient data corresponding to various zoom lens focal lengths while said address designating means is adapted to designate said set of addresses in accordance with combinations of a predetermined one of said digital signals from said receiving means and said digital data from said digital data producing means.

16. An interchangeable lens as claimed in claim 14, wherein said interchangeable lens as a zoom lens and further comprises means for producing digital data corresponding to a set focal length of said zoom lens, and wherein said ROM includes a set of addresses for storing various deflection data corresponding to various zoom lens focal lengths while said address designating means is adapted to designate said set of addresses in accordance with combinations of a predetermined one of said digital signals from said receiving means and said digital data from said digital data producing means.

17. An interchangeable lens as claimed in claim 16, wherein said ROM includes another set of dresses for storing various conversion coefficient data corresponding to various zoom lens focal length while said address designating means is adapted to designate said another set of addresses in accordance with combinations of another predetermined one of said digital signals from said receiving means and said digital data from said digital data producing means.

18. In an auto-focusing system for use in a camera having an interchangeable lens and a camera body which is provided with focus condition detecting means and drive means, said interchangeable lens detachably mountable to said camera body comprising:
an objective lens driven by said drive means for focusing;
receiving means for receiving first and second signals fed from said camera body to said interchangeable lens;
storage means for storing deflection data indicating a focusing error due ro aberration of said objective lens and conversion coefficient data for converting the amount of defocus of an image formed by said objective on a predetermined image-receiving plane with respect to a properly focused image thereon and detected by said focus condition detecting means into the amount of drive to be effected by said drive means, said deflection data and said conversion coefficient data being intrinsic to said interchangeable lens; and,
transmitting means for transmitting said deflection data and conversion coefficient data to said camera body in accordance with said first and second signals received by said receiving means, respectively.

19. An interchangeable lens as claimed in claim 18, further comprising means for producing focal length data representing the set focal length of said objective lens, said storage means further storing different deflection data and different conversion coefficient data for different focal lengths, said transmitting means transmitting the deflection data and the conversion coefficient data specified by said focal distance data to said camera body in accordance with said first and second signals, respectively.

20. An auto-focusing system for use in a camera comprising:
an object lens;
infrared light emitting means for emitting infrared light toward a target object;
focus condition detecting means for detecting the focus condition of an image of said target object formed by said objective lens on a predetermined image-forming plane and for producing a focus signal indicating the detected focus condition;
data producing means for producing a deflection signal indicating a difference between an image-forming distance of said objective lens for infrared light and that for visible light;
means for selectively energizing said light emitting means; and,
drive means for driving said objective in accordance with both said focus signal and said deflection signal when the focus condition detection is effected with said light emitting means energized while driving said objective in accordance with only said focus signal when the focus condition detection is effected with said light emitting means de-energized, whereby said objective lens is driven to a position for properly focusing said visible light on said image-forming plane, irrespectively of the energization and de-energization of said light emitting means.

21. An auto-focusing system as claimed in claim 20, wherein said energizing means includes:
brightness detecting means for detecting whether or not said target object has brightness above a predetermined level; and
means for energizing said light emitting means only upon detection of the brightness below said predetermined level.

* * * * *